United States Patent
Jang et al.

(10) Patent No.: US 9,930,313 B2
(45) Date of Patent: Mar. 27, 2018

(54) IMAGE DISPLAY DEVICE FOR PROVIDING FUNCTION OF CHANGING SCREEN DISPLAY DIRECTION AND METHOD THEREOF

(71) Applicant: LG ELECTRONICS INC., Seoul (KR)

(72) Inventors: Hyungseok Jang, Seoul (KR); Sangjo Park, Seoul (KR); Dongyoung Lee, Seoul (KR); Soonbo Han, Seoul (KR); Donghyun Kang, Seoul (KR); Hyojin Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 14/779,397

(22) PCT Filed: Apr. 1, 2013

(86) PCT No.: PCT/KR2013/002685
§ 371 (c)(1),
(2) Date: Sep. 23, 2015

(87) PCT Pub. No.: WO2014/163214
PCT Pub. Date: Oct. 9, 2014

(65) Prior Publication Data
US 2016/0065936 A1    Mar. 3, 2016

(51) Int. Cl.
*H04N 13/00* (2006.01)
*H04N 13/04* (2006.01)
(Continued)

(52) U.S. Cl.
CPC ..... *H04N 13/0051* (2013.01); *G02B 27/2214* (2013.01); *G06F 3/04845* (2013.01);
(Continued)

(58) Field of Classification Search
USPC .............................................. 348/42, 51, 55
See application file for complete search history.

(56) References Cited

U.S. PATENT DOCUMENTS

2004/0041747 A1 * 3/2004 Uehara ................. G02B 3/005
345/6
2005/0219244 A1    10/2005 Weiss
(Continued)

OTHER PUBLICATIONS

International Search Report and Written Opinion dated Jan. 6, 2014 issued in Application No. PCT/KR2013/002685.

*Primary Examiner* — Nigar Chowdhury
(74) *Attorney, Agent, or Firm* — Ked & Associates LLP

(57) ABSTRACT

There are provided an image display device providing a function of changing a screen display direction and an image display method. The image display for providing a 3D image according to a glass-free scheme on the basis of binocular disparity includes: a display unit configured to display a 3D image on a screen; a sensing unit configured to sense whether an event in relation to a change in a disposition direction of a layer generating binocular disparity corresponding to the 3D image and a change in a rendering scheme corresponding to the 3D image; and a control unit configured to change the disposition direction of the layer and the rendering scheme corresponding to the 3D image on the basis of the event.

12 Claims, 19 Drawing Sheets

(51) Int. Cl.
  *G02B 27/22* (2018.01)
  *G06F 3/0484* (2013.01)
  *G06T 3/60* (2006.01)
(52) U.S. Cl.
  CPC .......... *G06T 3/60* (2013.01); *H04N 13/0022* (2013.01); *H04N 13/0409* (2013.01); *H04N 13/0422* (2013.01); *H04N 13/0452* (2013.01); *H04N 13/0497* (2013.01)

(56) References Cited

U.S. PATENT DOCUMENTS

| | | | |
|---|---|---|---|
| 2007/0081208 A1 | 4/2007 | Chang et al. | |
| 2010/0053151 A1* | 3/2010 | Marti | G06F 3/011 345/419 |
| 2010/0115455 A1* | 5/2010 | Kim | G06F 3/04815 715/781 |
| 2010/0201790 A1* | 8/2010 | Son | G02B 27/2264 348/53 |
| 2011/0164029 A1* | 7/2011 | King | G06F 3/04883 345/419 |
| 2011/0187709 A1* | 8/2011 | Lee | G06F 3/041 345/419 |
| 2012/0075540 A1 | 3/2012 | Chen et al. | |
| 2012/0105579 A1* | 5/2012 | Jeon | H04N 5/2258 348/38 |
| 2012/0113216 A1* | 5/2012 | Seen | H04N 5/23293 348/38 |
| 2012/0133645 A1* | 5/2012 | Jung | H04N 13/0022 345/419 |
| 2012/0154891 A1 | 6/2012 | Yeh et al. | |
| 2012/0159364 A1* | 6/2012 | Hyun | G06F 3/0481 715/766 |
| 2012/0182404 A1 | 7/2012 | Hsu et al. | |
| 2012/0200495 A1* | 8/2012 | Johansson | G06F 3/011 345/156 |
| 2012/0257025 A1* | 10/2012 | Kim | H04N 13/0497 348/51 |
| 2013/0176301 A1* | 7/2013 | Yeon | H04N 13/0022 345/419 |
| 2014/0043436 A1* | 2/2014 | Bell | H04N 13/0203 348/46 |

\* cited by examiner

[Fig. 1]
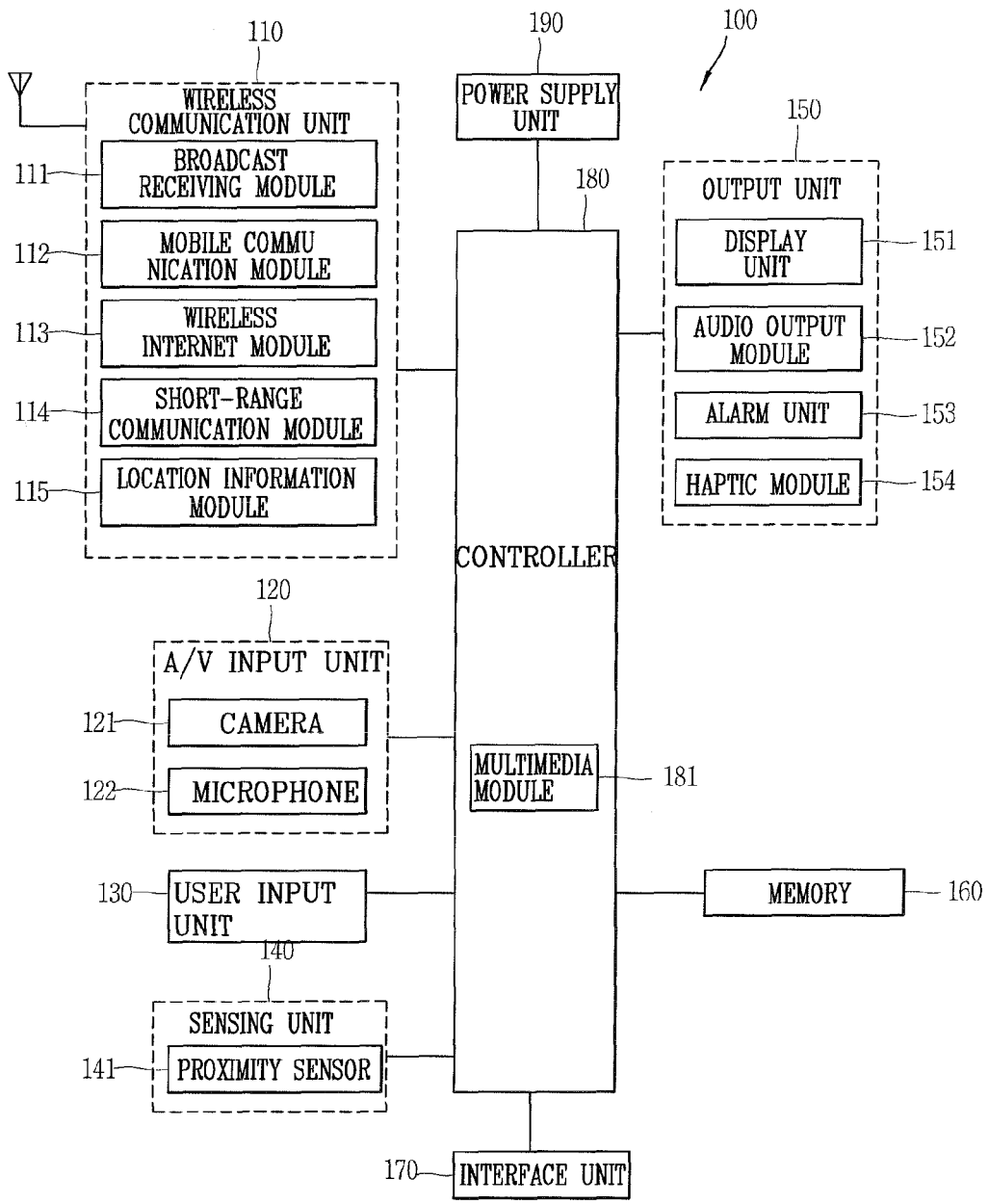

[Fig. 2a]
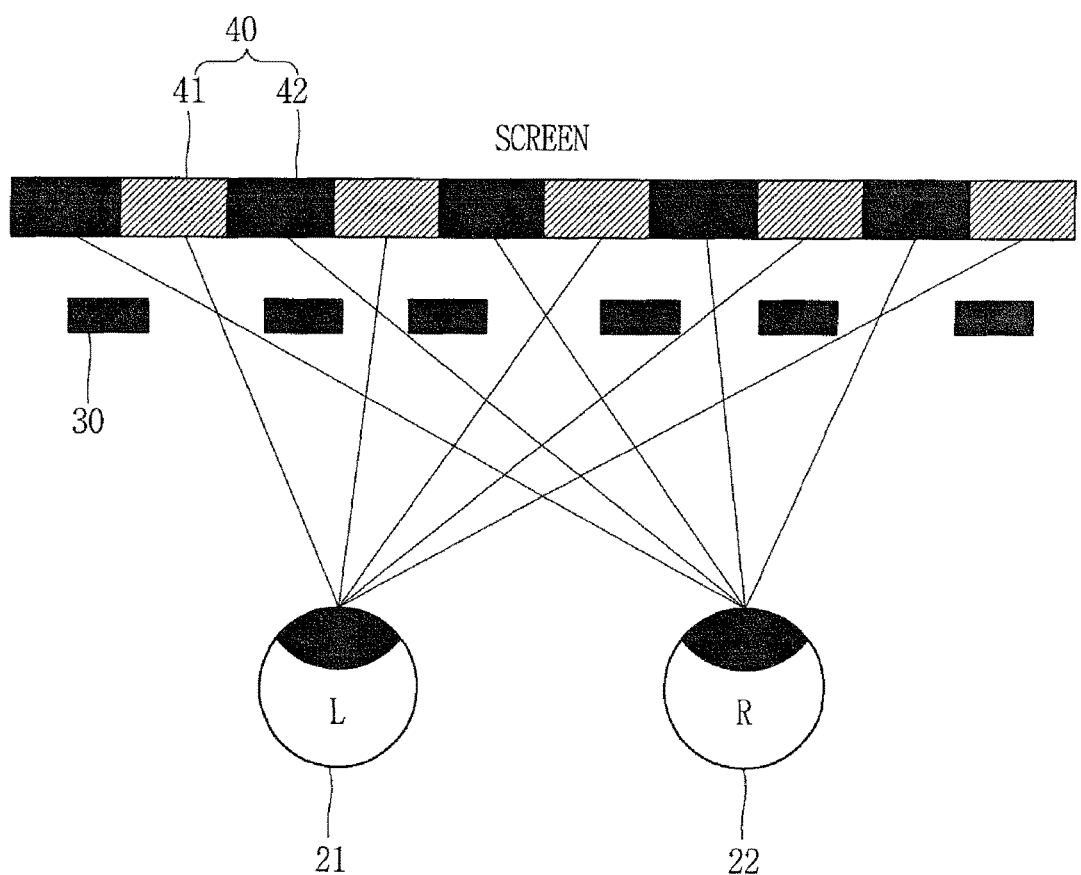

[Fig. 2b]
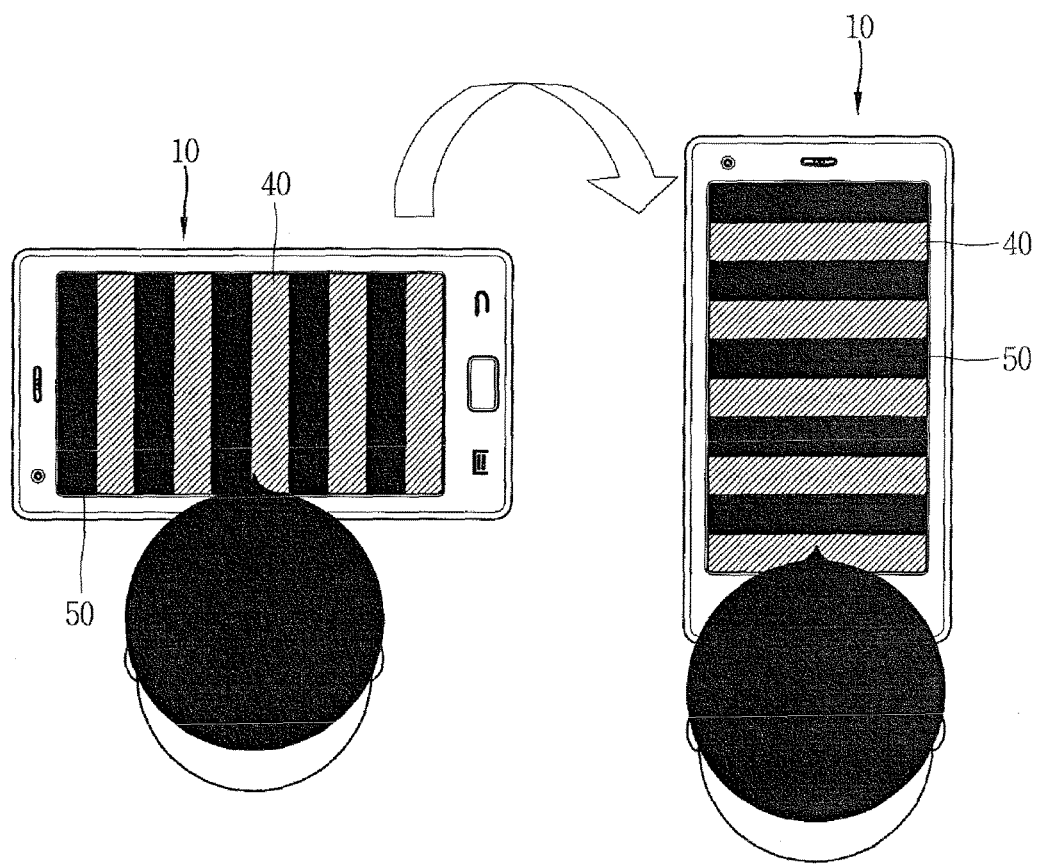

[Fig. 3]
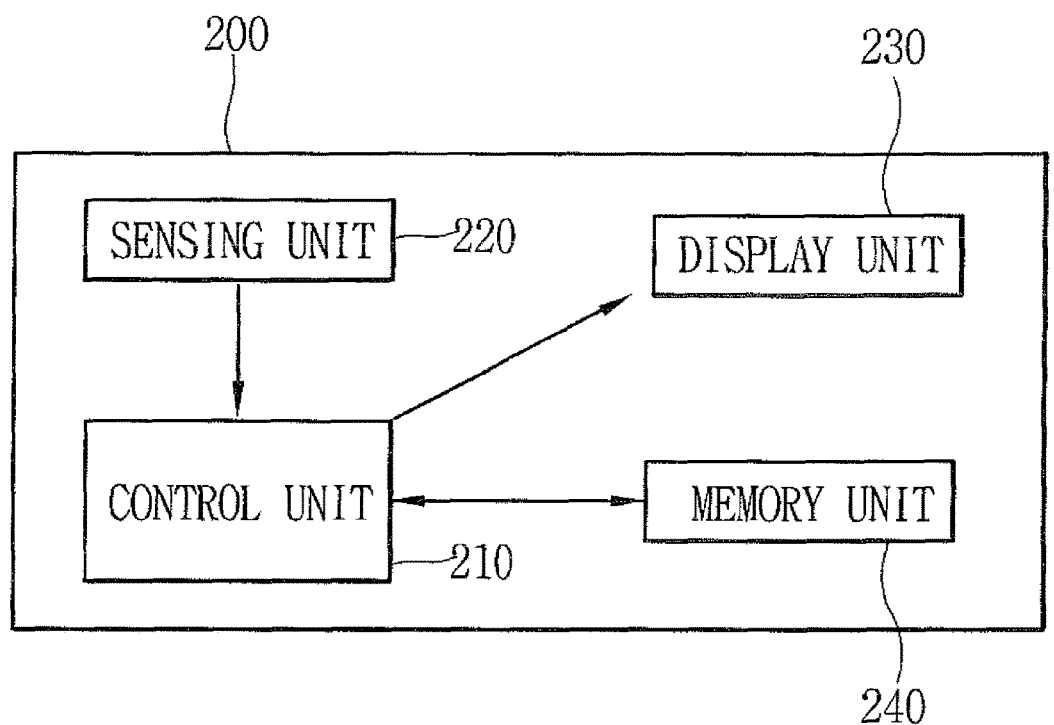

[Fig. 4]
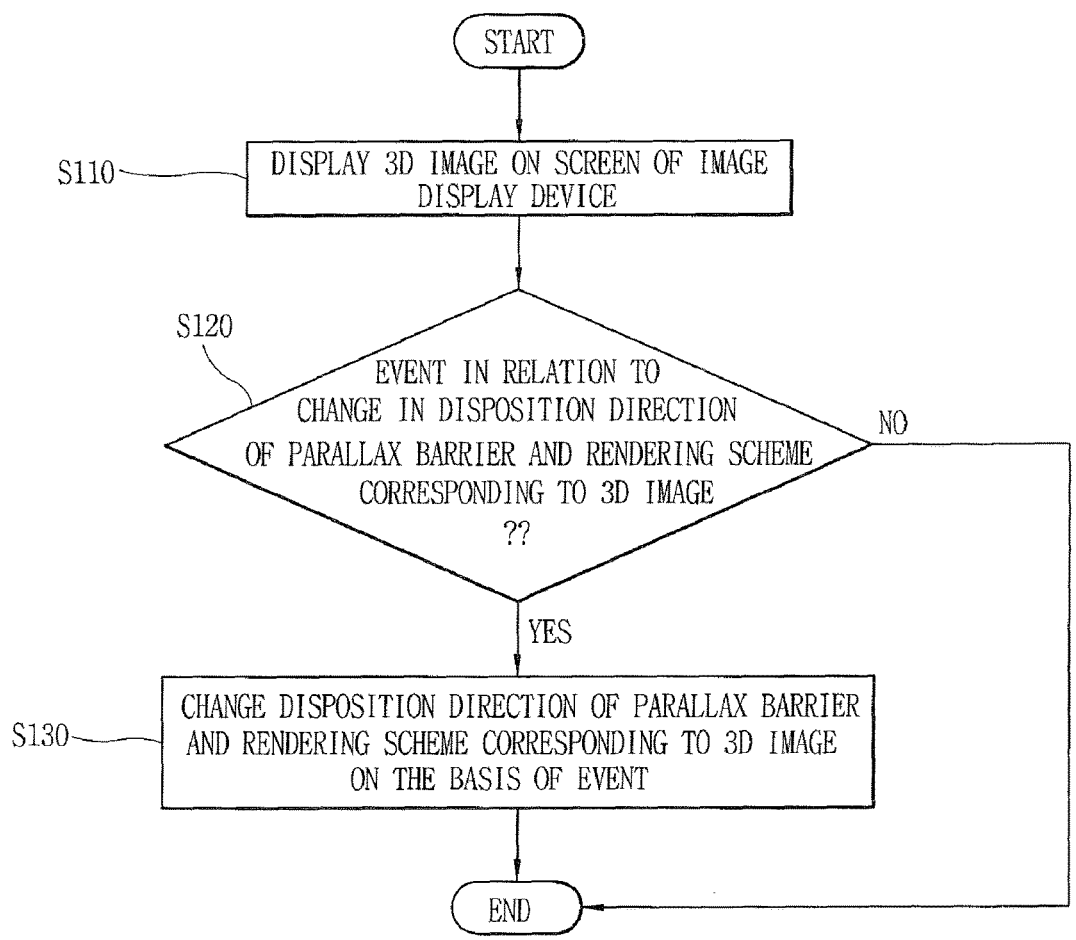

[Fig. 5a]
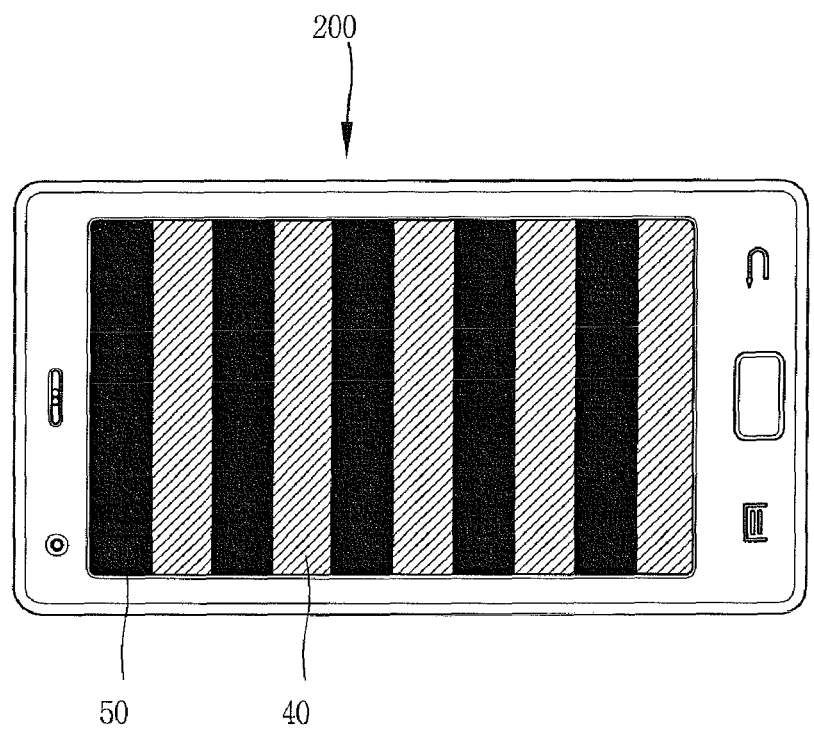

[Fig. 5b]
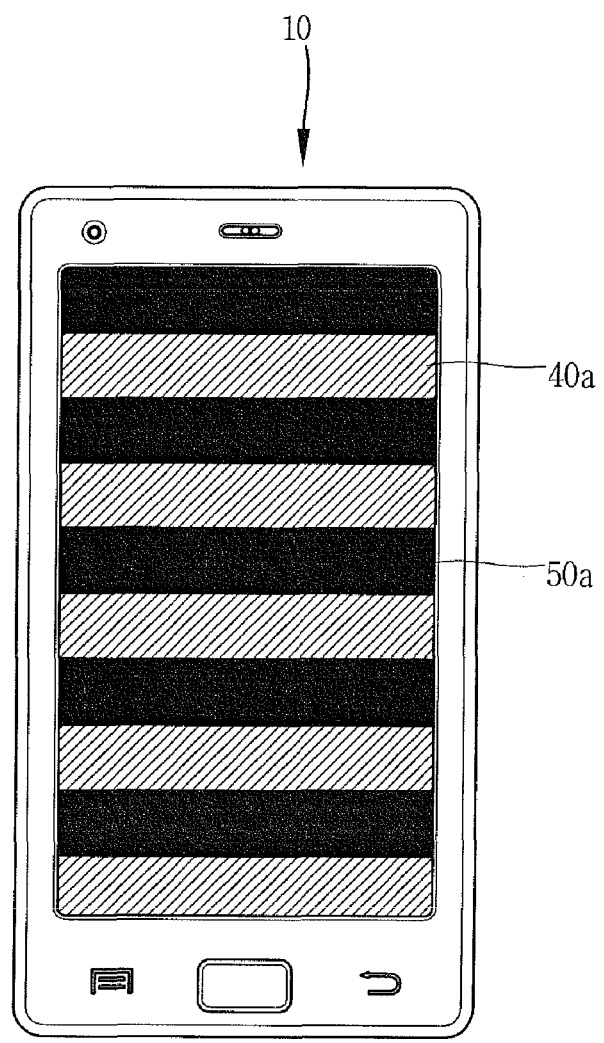

[Fig. 5c]
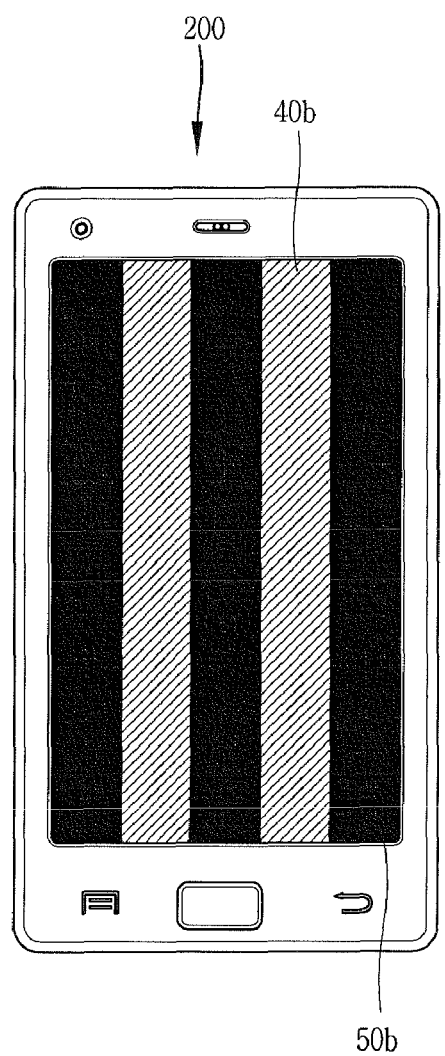

[Fig. 6a]
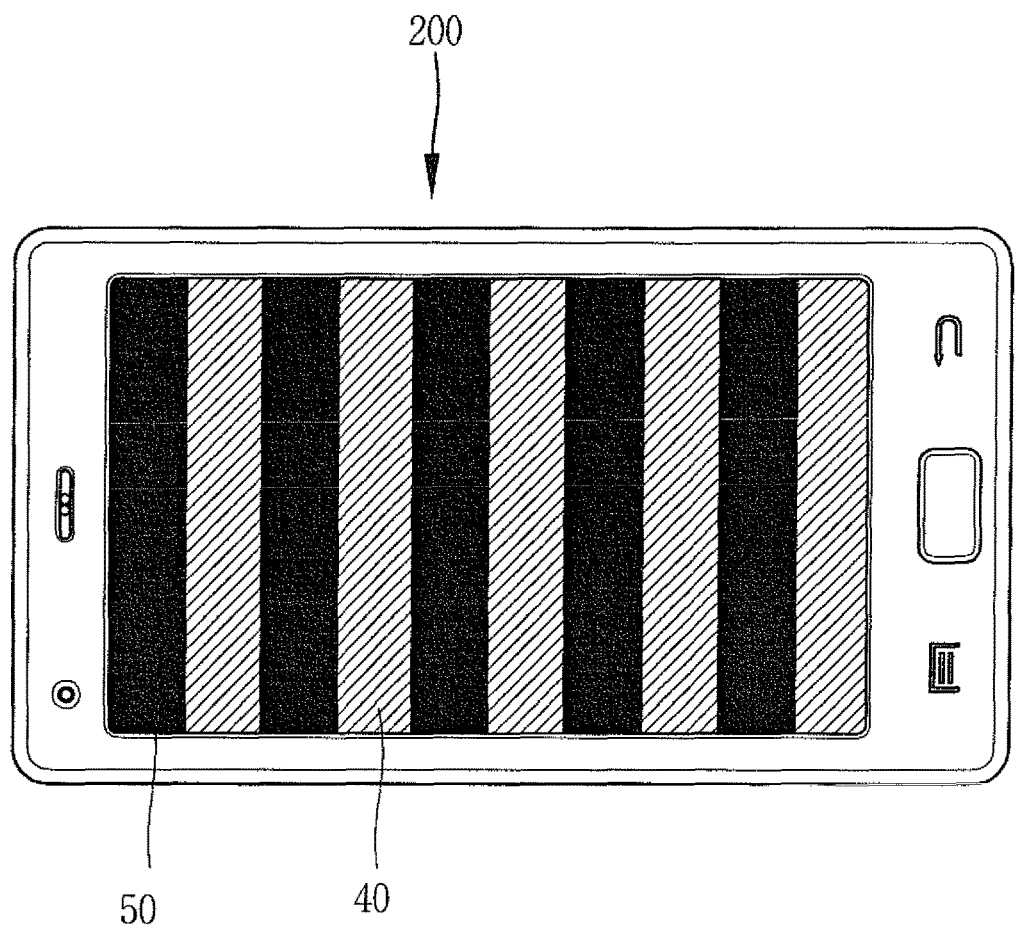

[Fig. 6b]
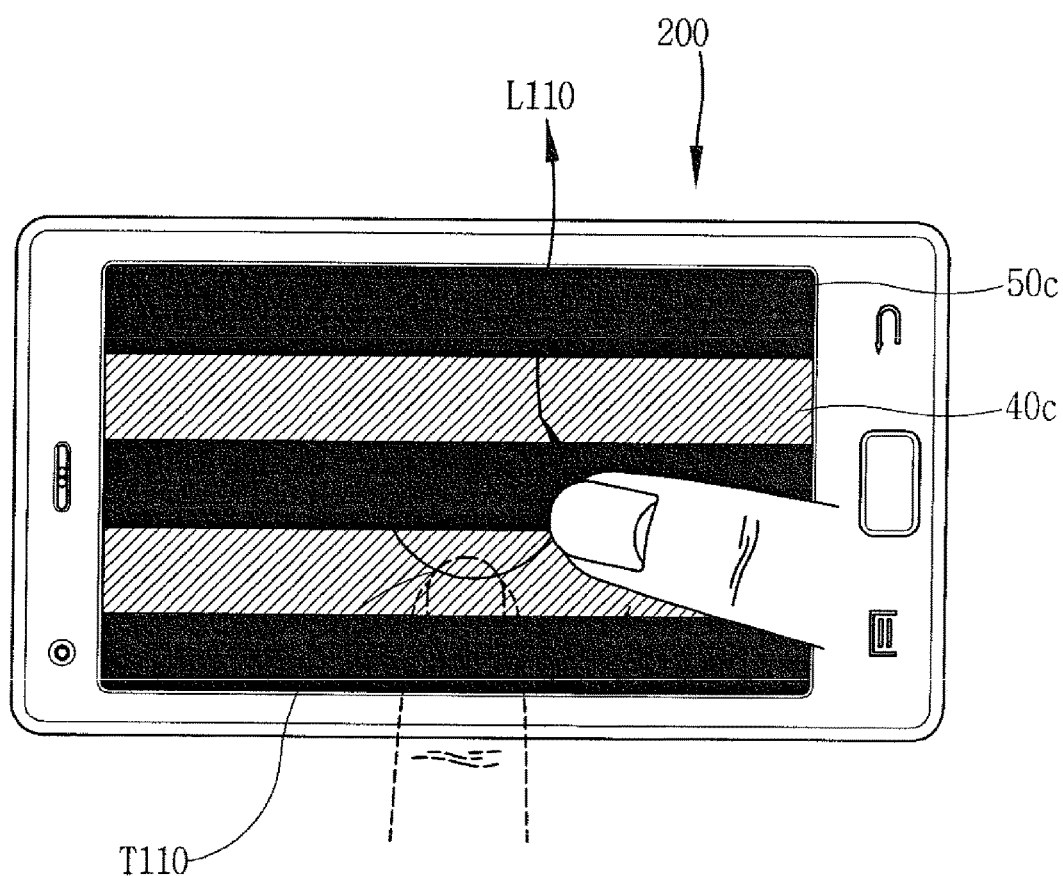

[Fig. 6c]
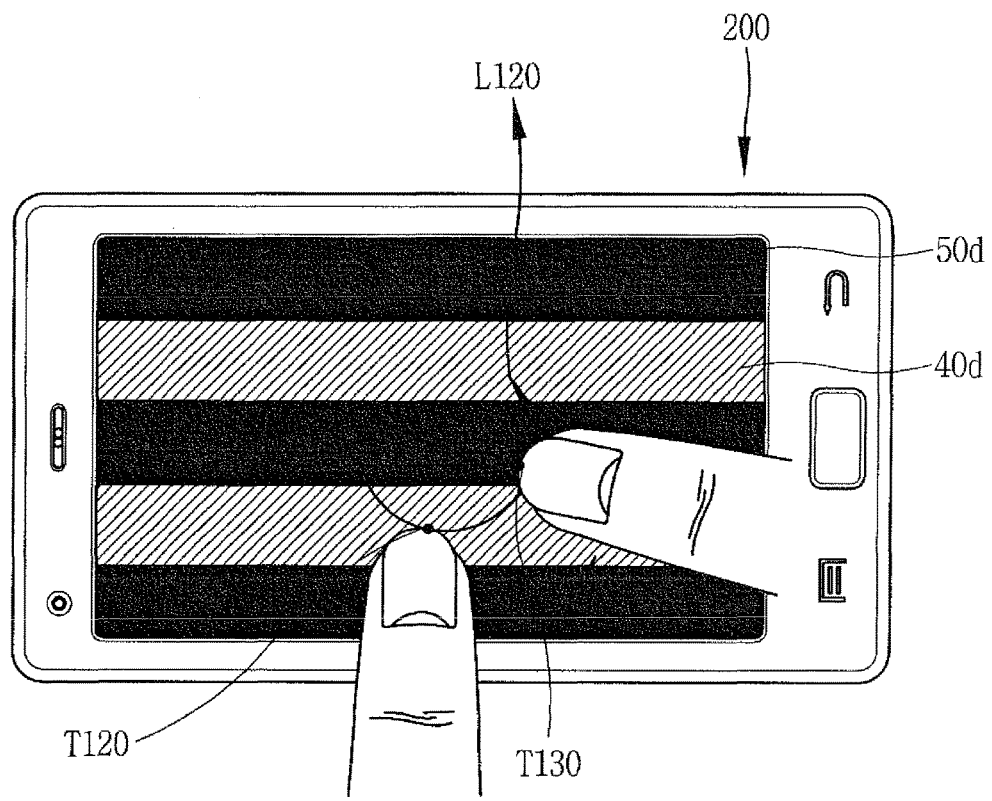

[Fig. 7a]
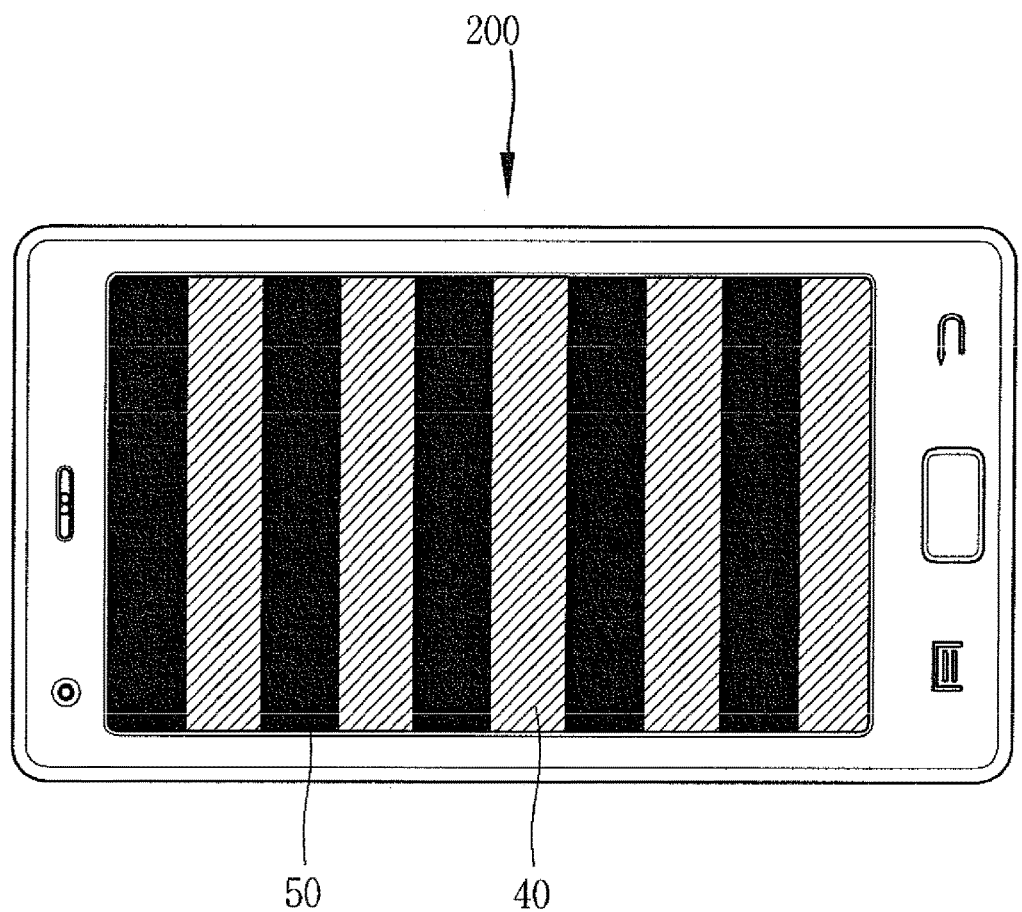

[Fig. 7b]
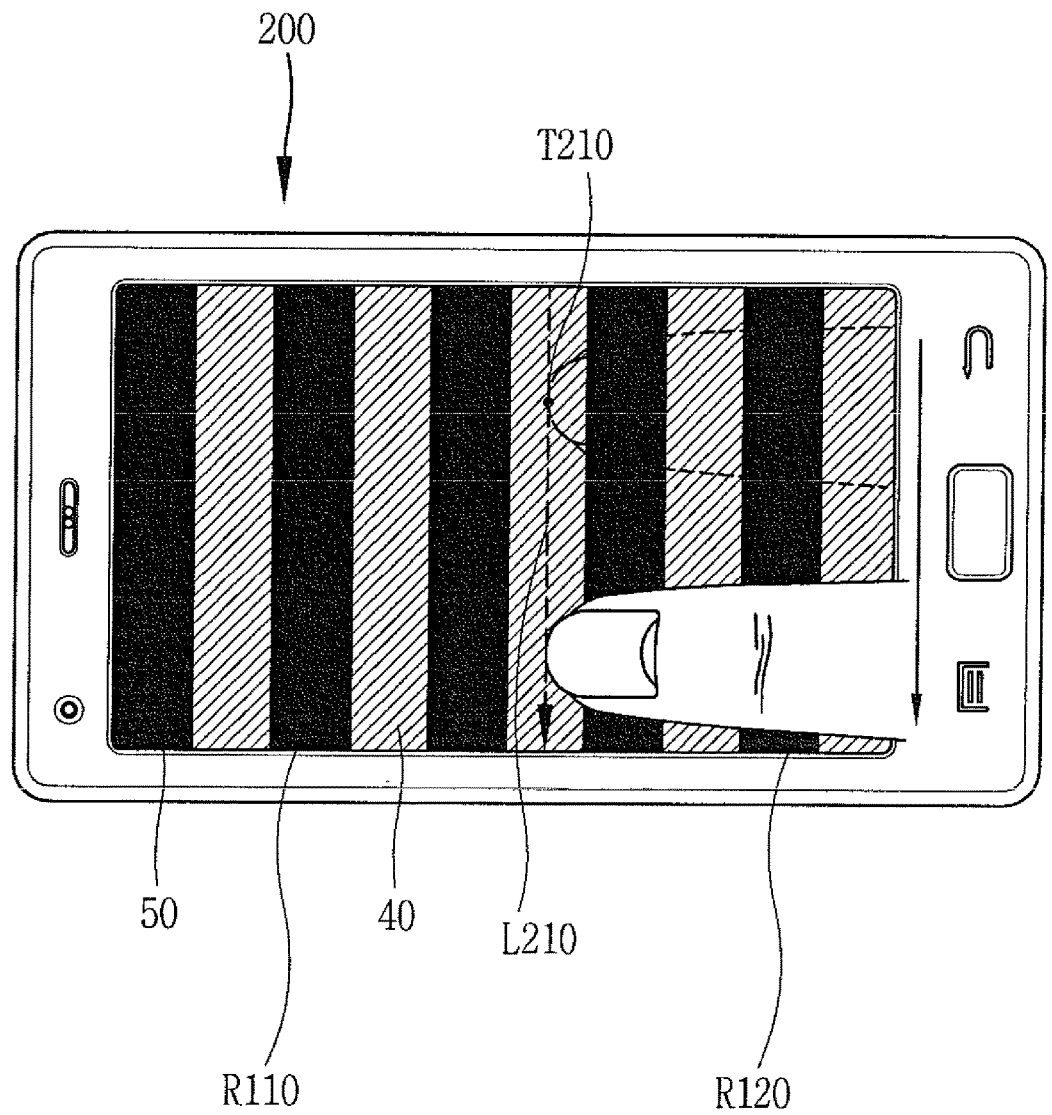

[Fig. 7c]
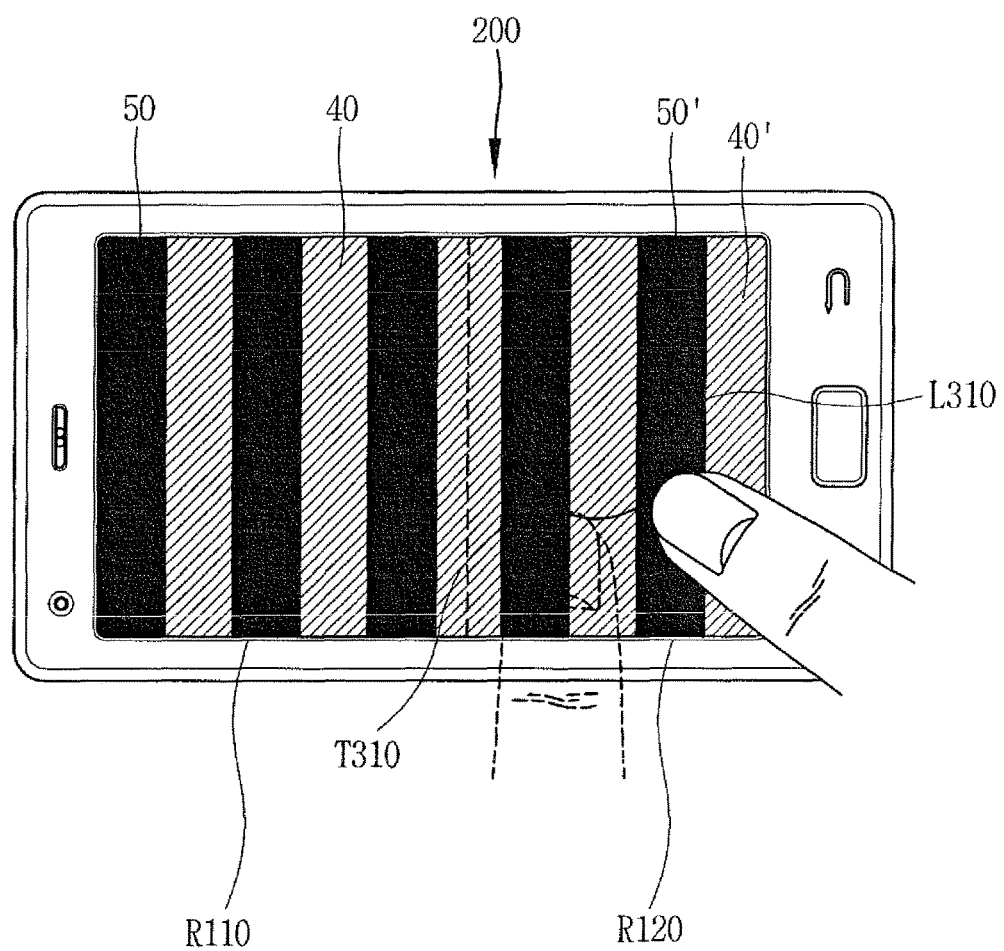

[Fig. 7d]
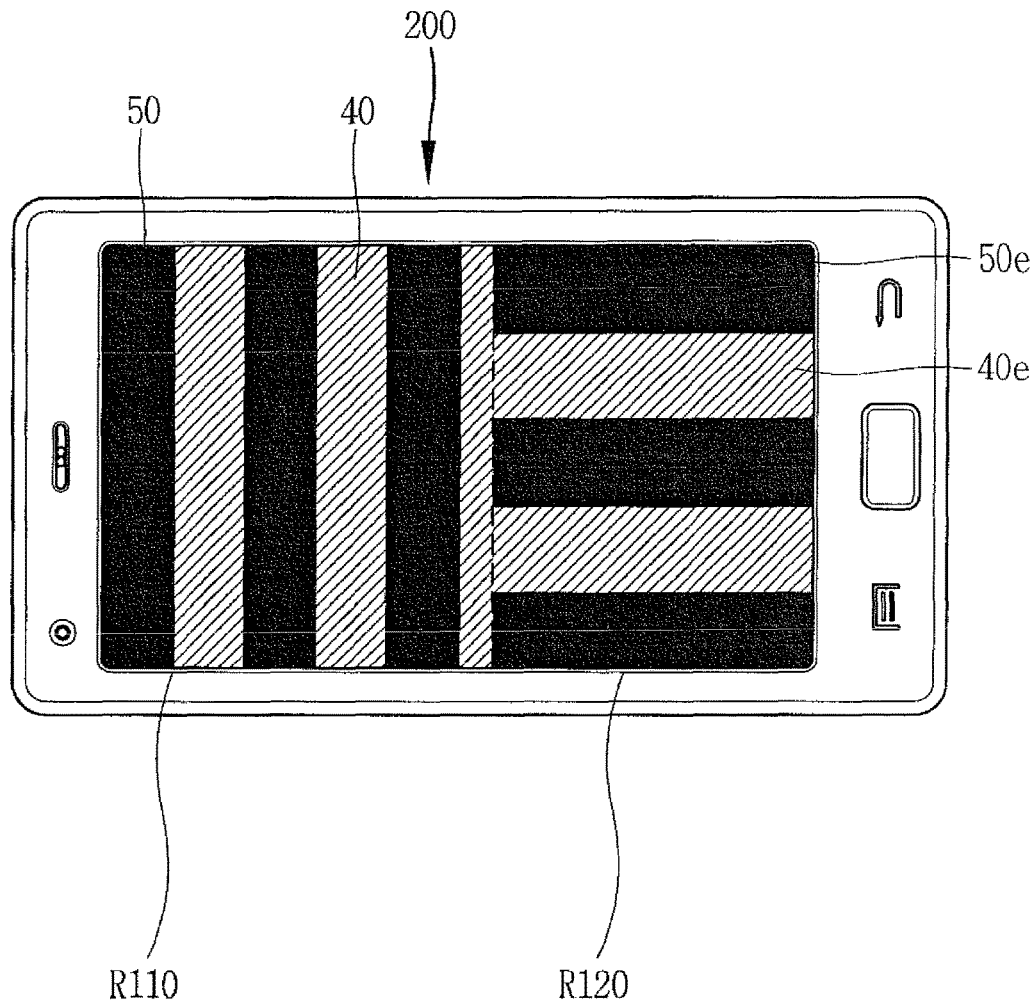
[Fig. 8a]
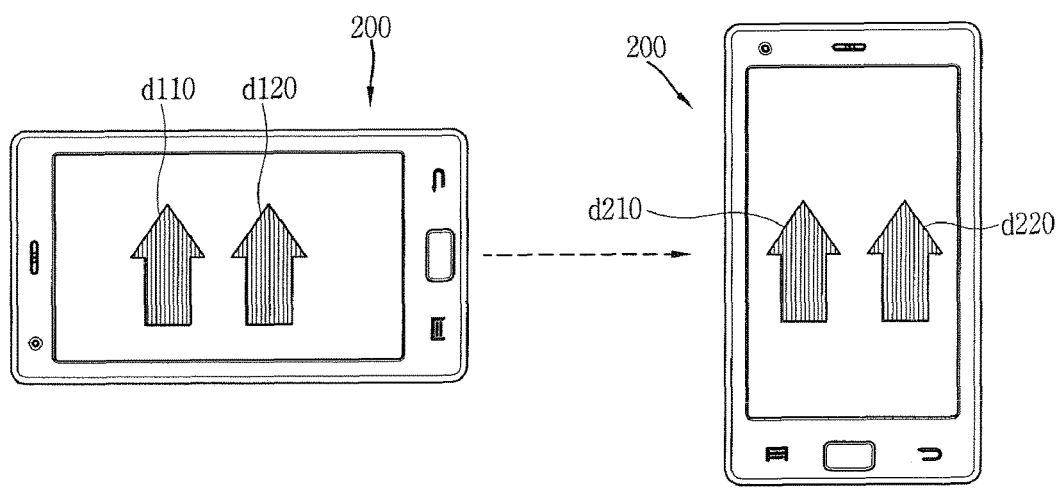

[Fig. 8b]
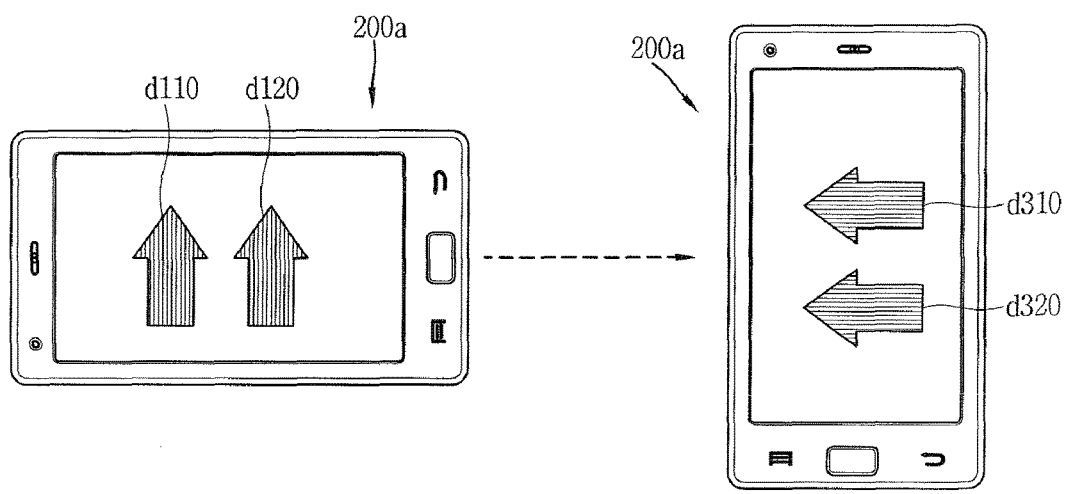
[Fig. 8c]
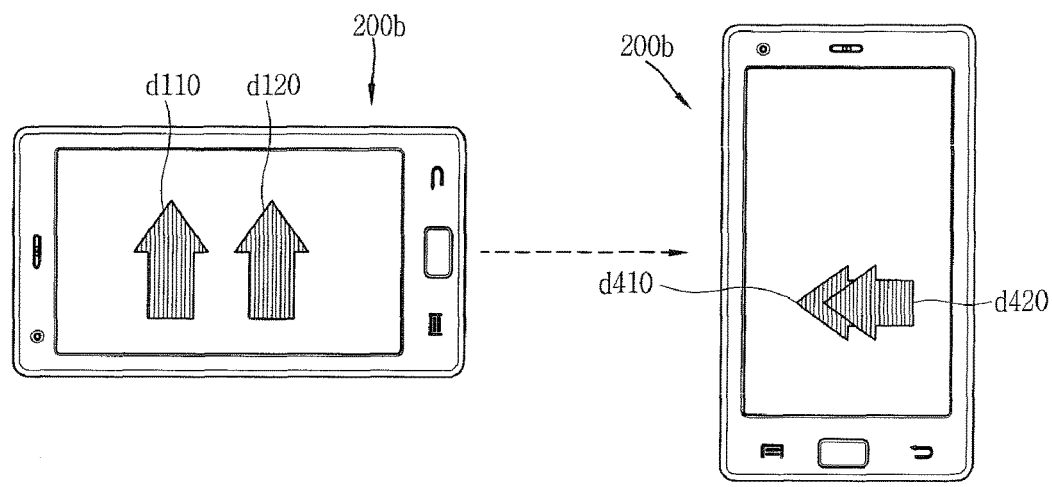

[Fig. 9a]
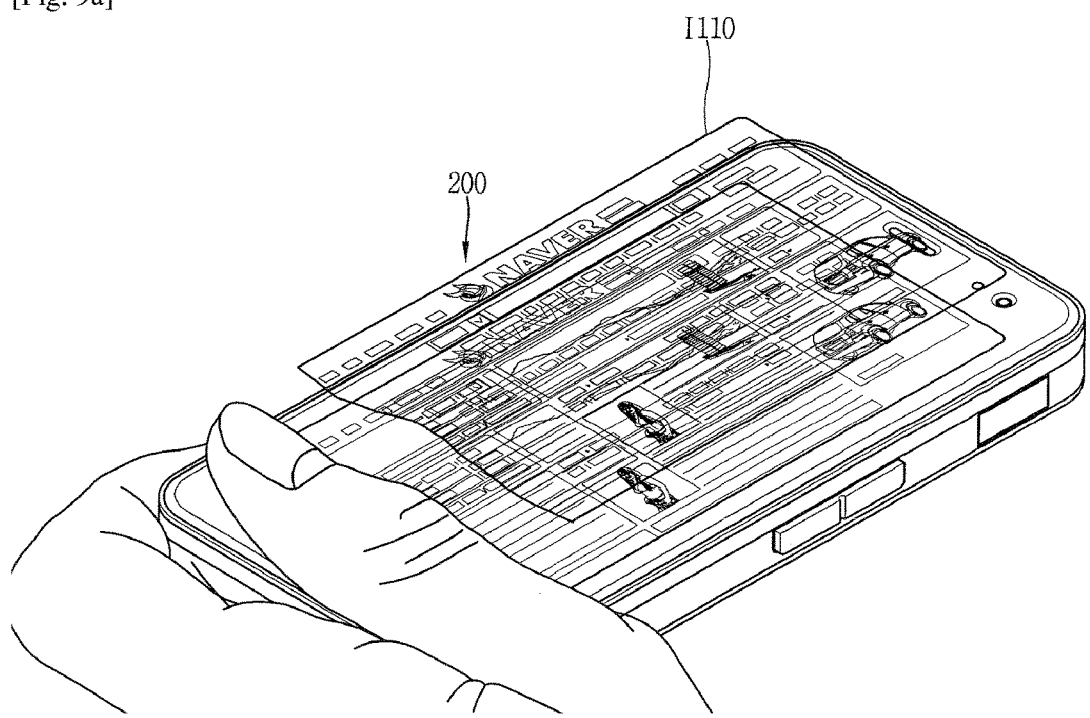

[Fig. 9b]
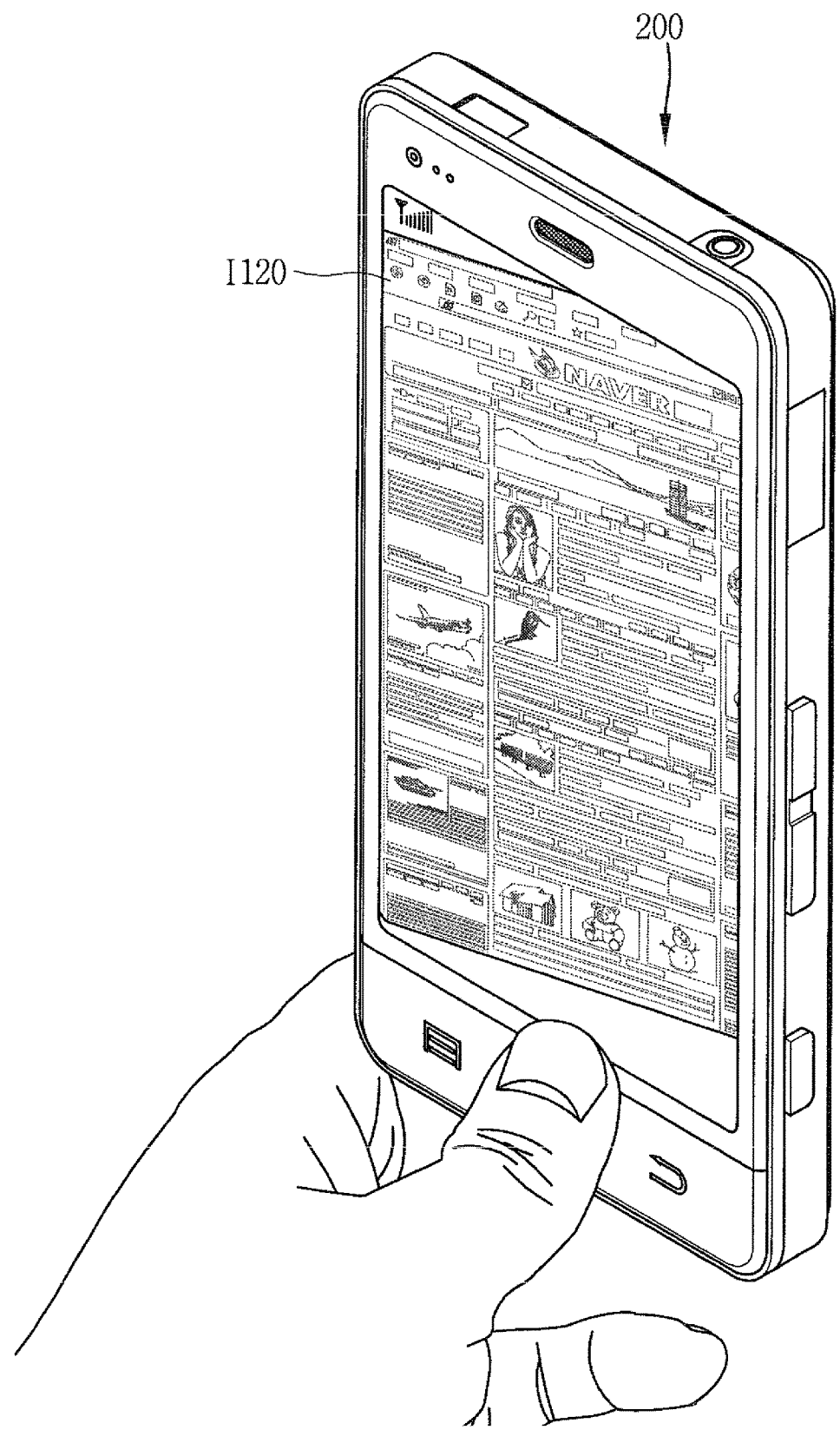

[Fig. 10]
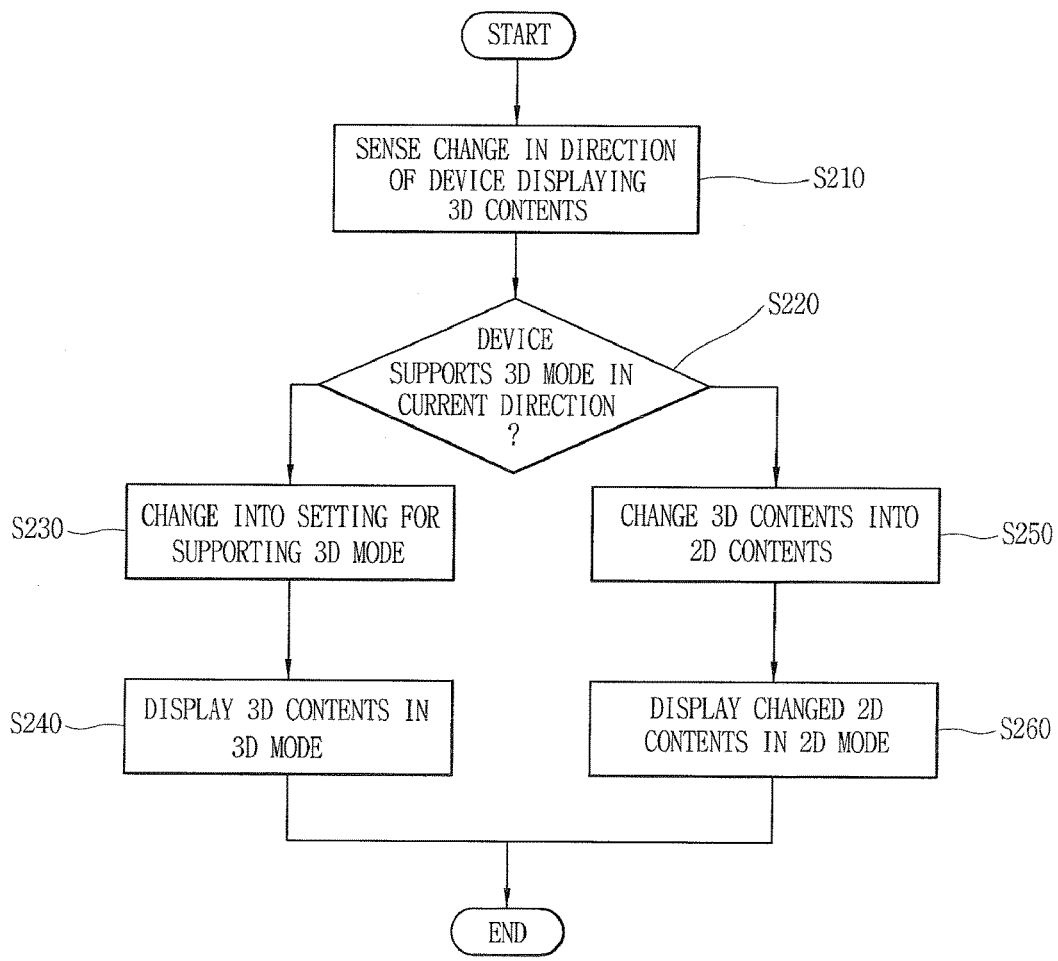

IMAGE DISPLAY DEVICE FOR PROVIDING FUNCTION OF CHANGING SCREEN DISPLAY DIRECTION AND METHOD THEREOF

CROSS-REFERENCE TO RELATED PATENT APPLICATION

This application is a U.S. National Stage Application under 35 U.S.C. § 371 of PCT Application No. PCT/KR2013/002685, filed Apr. 1, 2013, whose entire disclosure is hereby incorporated by reference.

TECHNICAL FIELD

The present invention relates to an image display device providing a function of changing a screen display direction, and an image display method.

BACKGROUND ART

A 3D display may be simply defined as an "embodiment of a system reproducing a 3D screen artificially".

Here, a system includes both a software technique allowing an object to be seen three-dimensionally and hardware implementing contents created by a software technique three-dimensionally. The reason for including even the software area is because, in case of 3D display hardware, contents configured by separate software are separately required for each stereoscopic implementation method.

Also, a virtual 3D display is an embodiment of a system providing stereoscopic sense to a user virtually in planar display hardware by using binocular disparity occurring as humans' eyes are spaced apart by about 65 mm in a horizontal direction among various factors by which users may feel depth. In other words, humans' eyes view slightly different images (strictly speaking, humans' eyes slightly share horizontal spatial information) due to binocular disparity although they view the same object, and when the two images are transmitted to the brain through retina, the brain accurately unite (or merge) to make humans feel depth. On the basis of this phenomenon, a 2D display device is designed to simultaneously display two left and right images and allow the left eye to view the left image and the right eye to view the right image to thus create a virtual stereoscopic sense, implementing a virtual 3D display.

In order to display images of two channels on a single screen of a virtual 3D display hardware device, in most cases, channels are output one by one by changing lines one by one in either horizontal or vertical direction in a single screen. When images of two channels are simultaneously output from a single display device, a right image is transferred to a right eye as it is and a left image is transferred to only a left eye in case of a glassless (or glass-free) scheme in terms of hardware structure. Also, in case of a glass scheme, a right image is covered such that a left eye cannot view it and a left image is covered such that a right eye cannot view it through appropriate respective special glasses.

Although channels are output one by one by changing lines, since a thickness of the lines and a space between lines are as small as 0.1 mm to 0.5 mm, users' eyes cannot recognize it and respective eyes recognize two images of respective channels, as one screen. In this case, however, in comparison to a case of using a 2D screen, an amount of information transferred to the eyes is divided into half for each channel, reducing resolution and user-perceived brightness to half.

A stereoscopic image display method includes a glass type method in which a user wear glasses and a glass-free method in which a user does not wear glasses.

Typical glass-free methods include a lenticular method and a parallax barrier method. In the lenticular method, a lenticular lens plate with cylindrical lenses vertically arranged thereon is installed in front of a display panel.

In the parallax barrier method, two left and right images are alternately disposed at appropriate intervals behind openings corresponding to fine slits included in a parallax barrier, and when the two images are viewed through the openings at a particular timing, the both images are accurately separately viewed. To put it simply, left and right channels are simply blocked by a wall so as to be distinguished, without using an optical technique such as a polarization method.

Meanwhile, in line with the information-oriented age which has recently been rapidly advanced, various utilization methods of display devices have been proposed. For example, a product allowing one screen to be rotated vertically or horizontally so as to be appropriately used for a pertinent purpose has been introduced, which is currently utilized in a display screen for cell phones, a monitor, or the like.

Namely, existing display devices are generally fixed to display only a landscape image in which a horizontal width is greater than a vertical height or a portrait image of the reverse. However, recently, an image display device having a pivot function allowing the device to be rotated to display a landscape image or a portrait image as necessary has been studied. In case of watching movie, or the like, the image display device may operate in a landscape display mode, and in case of an operation for displaying a large amount of information, for example, in case of opening multiple text files and operating them, the image display device may operate in a portrait display mode.

DISCLOSURE OF INVENTION

Technical Problem

However, a method of providing a landscape image and a portrait image according to rotation of a display device is considered not to be appropriate for displaying a 3D image on the basis of a parallax barrier or lens array scheme yet.

Solution to Problem

An aspect of the present invention provides an image display device and an image display method providing a function of changing a screen display direction.

According to an aspect of the present invention, there is provided an image display device for providing a 3D image according to a glass-free scheme on the basis of binocular disparity, including: a display unit configured to display a 3D image on a screen; a sensing unit configured to sense whether an event in relation to a change in a disposition direction of a layer generating binocular disparity corresponding to the 3D image and a change in a rendering scheme corresponding to the 3D image; and a control unit configured to change the disposition direction of the layer and the rendering scheme corresponding to the 3D image on the basis of the event.

In an example in relation to the present disclosure, the glass-free scheme on the basis of binocular disparity may be a parallax barrier scheme, and the layer may be a parallax barrier.

In an example in relation to the present disclosure, the disposition direction of the parallax barrier may be a direction perpendicular to a line connecting(or a length direction of) both eyes of a user of the image display device.

In an example in relation to the present disclosure, the rendering scheme is a scheme implementing a 3D effect on the basis of a first image corresponding to a left eye of the user of the image display device and a second image corresponding to a right eye of the user of the image display device displayed according to a particular screen display scheme, wherein the 3D effect is implemented as an image depth corresponding to the 3D image is generated on the basis of a difference between viewing angles of the user with respect to the first image and the second image (i.e., a difference between viewing angles at which the user views the first image and the second image) generated through a space between patterns corresponding to the parallax barrier.

In an example in relation to the present disclosure, the particular screen display scheme may be at least one of a landscape image display scheme in which a width of a landscape image in a horizontal direction is greater than a height thereof in a vertical direction and a portrait image display scheme of the reverse.

In an example in relation to the present disclosure, the event may be a rotation of the image display device, the control unit may change a disposition direction of the parallax barrier and a rendering scheme corresponding to the 3D image on the basis of a rotation of the image display device, and a rotation of the image display device may be a rotation of a longer axis of the image display device from any one of a first direction horizontal to the length direction of both eyes of the user of the image display device and a second direction perpendicular to the length direction of the both eyes of the user to a different direction.

In an example in relation to the present disclosure, when the image display device is rotated from the first direction to the second direction, the control unit may change a direction of the parallax barrier from a direction perpendicular to the longer axis of the image display device to a direction horizontal to the longer axis of the image display device, and when the display device is rotated from the second direction to the first direction, the control unit may change the direction of the parallax barrier from the direction parallel to the longer axis of the image display device to the direction perpendicular to the longer axis of the image display device.

In an example in relation to the present disclosure, the 3D image may include a first image corresponding to the left eye of the user of the image display device and a second image corresponding to the right eye of the user of the image display device, wherein the first image and the second image may be displayed on the screen such that they are spaced apart from one another in the first direction by an image depth corresponding to the 3D image, wherein when a rotation of the image display device is sensed, the control unit may change the rendering scheme on the basis of a previously determined display scheme corresponding to the image display device, wherein when the display scheme of the image display device is a screen conversion mode, the control unit may change the rendering scheme such that the first image and the second image are rotated in a direction opposite to the rotation direction of the image display device, so as to be displayed, and when the display scheme of the image display device is a screen non-conversion mode, the control unit may change the rendering scheme such that the first image and the second image are kept to be spaced apart from one another in the first direction so as to be displayed on the screen.

In an example in relation to the present disclosure, the event may be a touch and drag event (which includes a touch event and a drag event) on the basis of the touch, and the control unit may change a disposition direction of the parallax barrier and the rendering scheme corresponding to the 3D image on the basis of the touch and the drag event.

In an example in relation to the present disclosure, the touch and the drag event may include a first touch and a first drag event rotating on the screen on the basis of the first touch, and the control unit may change the disposition direction of the parallax barrier and the rendering scheme corresponding to the 3D image on the basis of a rotation direction of the first drag event.

In an example in relation to the present disclosure, the control unit may change a disposition direction of the parallax barrier such that the parallax barrier is continuously disposed to be perpendicular to the length direction of the both eyes of the user of the image display device on the basis of the rotation direction of the first drag event.

In an example in relation to the present disclosure, the 3D image may include a first image corresponding to the left eye of the user of the image display device and a second image corresponding to the right eye of the user, wherein the first image and the second image may be displayed on the screen such that they are spaced apart spaced apart in a third direction horizontal to the length direction of both eyes of the user of the image display device by an image depth corresponding to the 3D image, wherein when the first drag event is sensed, the control unit may change the rendering scheme on the basis of a previously determined display scheme corresponding to the image display device, wherein when the display scheme of the image display device is a screen conversion mode, the control unit may change the rendering scheme such that the first image and the second image are rotated in a direction opposite to a rotation direction of the first drag event, and when the display scheme of the image display device is a screen non-conversion mode, the control unit may change the rendering scheme such that the first image and the second image are continuously displayed to be spaced apart in the third direction on the screen.

In an example in relation to the present disclosure, the touch and the drag event may include a second touch, a second drag event on the basis of the second touch, and a third touch and a third drag event rotating on the screen on the basis of the third touch, wherein the control unit may divide the screen into a first region and a second region on the basis of the second drag event, and change a disposition direction of a parallax barrier corresponding to any one of the first region and the second region and a rendering scheme of an image on the basis of the rotation direction of the third drag event.

In an example in relation to the present disclosure, the any one region may be a region in which the third touch has been applied among the first region and the second region.

In an example in relation to the present disclosure, an image corresponding to any one region may include a third image corresponding to the left eye of the user of the image display device and a fourth image corresponding to the right eye of the user, wherein when the third drag event is sensed, the control unit may change a rendering scheme corresponding to the any one region on the basis of a previously determined display scheme corresponding to the image display device such that the third image and the fourth image are rotated to be displayed in a direction opposite to a rotation direction of the third drag event.

In an example in relation to the present disclosure, when the image display device does not provide a function in relation to a change of the disposition direction of the parallax barrier and a change in the rendering scheme corresponding to the 3D image, the control unit may control the display unit to change the 3D image into a 2D image and display the same.

According to another aspect of the present invention, there is provided an image display method for providing a 3D image according to a glass-free scheme on the basis of binocular disparity, including: displaying a 3D image on a screen of an image display device; detecting whether an event in relation to a change in a disposition direction of a parallax barrier and a change in a rendering scheme corresponding to the 3D image occurs; and changing the disposition direction of the parallax barrier and the rendering scheme corresponding to the 3D image on the basis of the event.

In an example in relation to the present disclosure, the event may be a rotation of the image display device, and the rotation may be a rotation from one of a first direction in which a longer axis of the display device is horizontal to a length direction of both eyes of a user of the display device and a second direction in which the longer axis of the display device is perpendicular to the length direction of both eyes of the user, to the other direction, wherein the method may further include: detecting a rotation direction of the image display device, wherein the changing of the disposition direction of the parallax barrier and the rendering scheme corresponding to the 3D image may include: changing a direction of the parallax barrier from a direction perpendicular to the longer axis of the image display device to a direction horizontal to the longer axis of the image display device when the image display device is rotated from the first direction to the second direction, and changing a direction of the parallax barrier from the direction parallel to the longer axis of the image display device to the direction perpendicular to the longer axis of the image display device when the image display device is rotated from the second direction to the first direction.

In an example in relation to the present disclosure, the event may be a first touch and a first drag event rotated on the screen on the basis of the first touch, and the changing of a disposition direction of the parallax barrier and a rendering scheme corresponding to the 3D image may include changing a disposition direction of the parallax barrier and a rendering scheme corresponding to the 3D image on the basis of a rotation direction of the first drag event.

In an example in relation to the present disclosure, the method may further include: detecting whether the display device provides a function in relation to a change in a disposition direction of the parallax barrier or a change in the rendering scheme corresponding to the 3D image; and when the image display device does not provide a function relation to the change, changing a 3D image into a 2D image on the basis of the event and displaying the 2D image.

Advantageous Effects of Invention

According to embodiments of the present invention, the image display device providing a function of changing a screen display direction and the image display method are provided.

According to the image display device providing a glass-free 3D image on the basis of a parallax barrier scheme and the image display method, since a disposition direction of the parallax barrier and a rendering scheme corresponding to a 3D image are changed on the basis of an event occurring on the screen of the image display device, a user of the image display device can continuously visually recognize a 3D effect with respect to the 3D image.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram of a mobile terminal according to embodiments disclosed in the present disclosure.

FIGS. 2a and 2b are views schematically illustrating configurations of a general stereoscopic image display device on the basis of a parallax barrier scheme.

FIG. 3 is a block diagram illustrating a configuration of an image display device according to embodiments disclosed in the present disclosure.

FIG. 4 is a flow chart illustrating a process of a method for controlling a terminal according to embodiments disclosed in the present disclosure.

FIGS. 5a to 5c are views illustrating operations of an image display device according to a first embodiment disclosed in the present disclosure.

FIGS. 6a to 6c are views illustrating operations of an image display device according to a second embodiment disclosed in the present disclosure.

FIGS. 7a to 7d are views illustrating operations of an image display device according to the second embodiment disclosed in the present disclosure.

FIGS. 8a to 8c are views illustrating operations of an image display device according to a third embodiment disclosed in the present disclosure.

FIGS. 9a and 9b are views illustrating operations of an image display device according to a fourth embodiment disclosed in the present disclosure.

FIG. 10 is a flow chart illustrating an image display method according to the fourth embodiment disclosed in the present disclosure.

MODE FOR THE INVENTION

The present disclosures relates to an image display device providing a function of changing a screen display direction and an image display method.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

While terms such as "first" and "second," and the like, may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

The embodiments of the present invention will now be described with reference to the accompanying drawings, in which like numbers refer to like elements throughout, and a repetitive explanation will be omitted.

In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

A technique disclosed in the present disclosure may be applied to an image display device providing 3D contents (or displaying 3D contents on a screen) and an image display method. However, without being limited thereto, the technique disclosed in the present disclosure may also be applicable to all of an image display device, a multimedia device, a terminal, an image display system and a control method thereof, a portable device capable of displaying an image and a control method thereof, a device capable of executing an application in relation to multimedia, and a control method thereof, and the like, to which a technical concept of the technique is applicable.

For example, the technology disclosed in this specification may be applied to various terminals such as a smart phone, a portable terminal, a mobile terminal, a personal digital assistant (PDA), a portable multimedia player (PMP) terminal, a notebook computer, a Wibro terminal, an Internet protocol television (IPTV) terminal, a terminal for digital broadcasting, a telematics terminal, a navigation terminal, an audio video navigation (AVN) terminal, a television, a 3D television, an audio/video (A/V) system, a home theater system, an information providing center, a call center, and the like.

Description of Mobile Terminal Employing Image Display Method Disclosed in Present Disclosure FIG. 1 is a block diagram illustrating a configuration of a mobile terminal 100 according to embodiments disclosed in the present disclosure. The mobile terminal (or mobile phone) 100 may be implemented in various forms. For example, the mobile terminal 100 may include a portable phone, a smart phone, a notebook computer, a digital broadcast terminal, a personal digital assistant (PDA), a portable multimedia player (PMP), or the like.

As illustrated in FIG. 1, the mobile terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. FIG. 1 shows the mobile terminal as having various components, but it should be understood that implementing all of the illustrated components is not a requirement. Greater or fewer components may alternatively be implemented.

The wireless communication unit 110 may include one or more modules allowing radio communication between the mobile terminal 100 and a wireless communication system or a network in which the mobile terminal is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

Meanwhile, the broadcast associated information may also be provided via a mobile communication network and, in this case, the broadcast associated information may be received by the mobile communication module 112. The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideB and (UWB), ZigBee™, and the like.

The location information module 115 is a module for checking or acquiring a location (or position) of the mobile terminal (when the mobile terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry on the basis of the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The A/V input unit 120 is configured to receive an audio or video signal. The A/V input unit 120 may include a camera 121 and a microphone 122. The camera 121 processes image data of still pictures or video obtained by an image capturing device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data within the mobile terminal to an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a liquid crystal display (LCD), a thin film transistor-LCD (TFT-LCD), an organic light emitting diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

When the display unit 151 and a touch sensor are overlaid in a layered manner to form a touch screen, the display unit 151 may function as both an input device and an output device. The touch sensor may have the form of, for example, a touch film, a touch sheet, a touch pad, and the like.

The touch sensor may be configured to convert pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

A proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected on the basis of a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the mobile terminal 100 through a vibration means as a feedback with respect to the key signal input. Through the vibration, the user may recognize the occurrence of an event. A signal for notifying about the occurrence of an event may be output to the display unit 151 or to the voice output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module 182 recognizes a voice pronounced by the user and performs a corresponding function according to the recognized voice signal.

A navigation session 300 applied to the mobile terminal 100 displays a travel route on map data.

General Description of a 3D Stereoscopic Image 3D contents may include various 3D images (or stereoscopic images) or 3D objects generating a 3D effect.

In detail, a 3D stereoscopic image will be described. In general, a 3D stereoscopic image (hereinafter, referred to as a '3D image') may be an image allowing a user (or a viewer) to feel a depth at which an object is positioned and reality as if they were the same as those in a real space on a monitor or screen.

A 3D stereoscopic image may be implemented by using binocular disparity. The binocular disparity refers to disparity formed by two eyes of a user spaced apart from one another. Thus, when two eyes view different 2D images and the images are transferred to the brain through the retina and united, the user may feel a depth and reality of a stereoscopic image.

The 3D image may be displayed according to a display scheme such as a stereoscopic scheme (a glass scheme), an auto-stereoscopic scheme (a glass-free scheme), a projection scheme (or a holographic scheme) or the like.

The stereoscopic scheme is commonly used in a household television receiver, or the like. The stereoscopic scheme includes a wheatstone stereoscopic scheme, and the like. The auto-stereoscopic scheme is a display scheme commonly used in a mobile terminal, and the like. The auto-stereoscopic scheme includes a parallax barrier scheme and a lenticular scheme. Also, the projection scheme includes a reflective holographic scheme, a transmissive holographic scheme, and the like.

Typical auto-stereoscopic schemes (glass-free schemes) include a lenticular scheme in which a lenticular lens plate with cylindrical lenses arranged vertically thereon is installed in front of a display panel, and a parallax barrier scheme.

In the parallax barrier method, two left and right images are alternately disposed at an appropriate interval behind an opening as a fine slit known as a parallax barrier, and when viewed through the opening at a particular timing, the both images are accurately separately viewed. To put it simply, left and right channels are simply blocked by a wall so as to be discriminated, without using an optical technique such as a polarization method.

FIGS. 2a and 2b are views schematically illustrating configurations of a general stereoscopic image display device on the basis of a parallax barrier scheme.

As illustrated in FIGS. 2a and 2b, a general stereoscopic image display device 10 on the basis of the parallax barrier scheme may include a display panel (or the screen illustrated in FIGS. 2a and 2b) simultaneously displaying left and right images and a parallax barrier (please see FIG. 2a).

Here, left eye pixels L displaying an image for a left eye (or a left eye image) and right eye pixels R displaying an image for a right eye (or a right eye image) are alternately defined on the display panel, and the parallax barrier is disposed between the display panel and a user of the display device 10.

The parallax barrier includes slits and barriers 30 which are iteratively arranged to have a stripe form in a vertical direction with respect to the user and allow light coming from the left and right pixels L and R to selectively pass therethrough.

Thus, a left eye image 41 displayed on the left eye pixel L of the display panel reaches the user's left eye 21 through the slit of the parallax barrier, and a right eye image 42 displayed on the right eye pixel R of the display panel reaches the user's right eye 22 through the slit, and here, the left and right eye images 41 and 42 has separate images in consideration of disparity that can be sensed by the user, and the user combines the two images to recognize a 3D image 40.

Generating and displaying of a 3D image will be described in detail. In general, the 3D image 40 includes a left image (or a left eye image) 41 and a right image (or a right eye image) 42. The left image 41 and the right image 42

Generally, a 3D image includes a left image (left eye image) and a right image (right eye image). Methods of merging the left image 41 and the right image 42 into a 3D stereoscopic image may be classified into a top-down scheme in which the left and right images are disposed up and down in one frame, an L-to-R (left-to-right, side by side) scheme in which the left and right images are disposed left and right in one frame, a checker board scheme in which fragments of the left and right images are disposed in a tile form, an interlaced scheme in which the left image 41 and the right image 42 are alternately disposed by the column or by the row, a time division (time sequential or frame-by-frame) scheme in which the left and right images are alternately displayed by time, and the like.

A 3D effect with respect to the 3D image or a 3D object may be generated due to the presence of a depth (or a depth value) in the 3D image 40 or the 3D object.

The depth may also be called disparity.

A depth (or a depth value) of the 3D image will be described in detail. A depth (or a depth value) of a 3D image refers to an indicator indicating a difference between in distance between respective objects of the 3D image in three dimensions in a direction in which they are viewed. The depth is defined by 256 levels (a maximum value is 255 and a minimum value is 0), and a higher value represents a position closer to a viewer or a user. Thus, adjusting a depth in the 3D image 40 means that when the 3D image 40 is displayed to have the original size thereof, the 3D image 40 is displayed to have the original depth thereof, and when the 3D image 40 is displayed to have downscaled contents, the image is adjusted to have a depth lower than that of the original one.

For example, in a case in which the depth is defined to have 256 levels and a maximum value thereof is 255 and a minimum value thereof is 0, when a 3D image is displayed to have the original size thereof, the depth of the image is adjusted to 255, and when a 3D image is displayed to have a size smaller than that of the original one, the depth of the image is adjusted to have a value smaller than 255.

In the case of the general display device 10, as illustrated in FIG. 2b, when the display device 10 is changed from a horizontal direction to a vertical direction, a disposition direction of the parallax barrier 50 and a display direction of the 3D image 40 are not changed, so the user may not able to properly recognize a 3D effect visually.

Description of Image Display Device According to Embodiments Disclosed in the Present Disclosure An image display device according to embodiments disclosed in the present disclosure may be an image display device providing a glass-free 3D image on the basis of binocular disparity, which includes a display unit displaying a 3D image on a screen thereof, a sensing unit sensing whether an event in relation to a change in a disposition direction of a layer generating binocular disparity corresponding to the 3D image and a change in a rendering scheme corresponding to the 3D image, and a control unit changing the disposition direction of a layer and the rendering scheme corresponding to the 3D image on the basis of the event.

In an embodiment disclosed in the present disclosure, the glass-free scheme on the basis of binocular disparity may be a parallax barrier scheme and the layer may be a parallax barrier.

Also, in another embodiment of the present invention, the glass-free scheme on the basis of binocular disparity may be a fly-eye lenticular scheme, and the layer may be a layer including a fly-eye lens.

Besides, it is obvious to a person skilled in the art that any glass-free scheme on the basis of binocular disparity is applicable to the image display device and the image display method disclosed in the present disclosure.

Hereinafter, a case in which the glass-free scheme on the basis of binocular disparity is a parallax barrier scheme will be described.

FIG. 3 is a block diagram illustrating a configuration of an image display device according to embodiments disclosed in the present disclosure.

Referring to FIG. 3, an image display device 200 according to embodiments disclosed in the present disclosure may include a control unit 210, a sensing unit 220, and a display unit 230.

Also, the image display device 200 according to an embodiment of the present invention may further include a memory unit 240 storing various types of information used to provide a function of changing a screen display direction.

Besides, the image display device 200 may further include various components for providing the function of changing a screen display direction.

The components illustrated in FIG. 3 are not essential and the image display device 200 may be implemented to include fewer or more components.

Also, the image display device disclosed in the present disclosure may be implemented with the elements of the foregoing mobile terminal, so the elements illustrated in FIG. 3 may be implemented by the elements illustrated in FIG. 1 or combinations thereof. For example, the control unit 210 may correspond to the control unit 180 of FIG. 1 or may execute a function obtained by combining the function of the control unit 180 and a function of some of other elements.

Hereinafter, the elements will be described in detail.

The control unit 210 may support various functions to provide a function of changing a screen display direction.

Basically, the control unit 210 may serve to control the elements of the image display device 200 to provide the function of changing a screen display direction.

Also, the control unit 210 may obtain information regarding an event in relation to a change in a disposition direction of the parallax barrier of the image display device and a change in a rendering scheme corresponding to a 3D image provided by the display unit 130 (or displayed on the screen) from the sensing unit 220.

The control unit 210 may change the disposition direction of the parallax barrier and the rendering scheme corresponding to the 3D image on the basis of the event.

Here, the disposition direction of the parallax barrier may be a direction perpendicular to a line connecting(or length direction of) both eyes of the user of the image display device 200.

Also, the rendering scheme is a scheme implementing a 3D effect on the basis of a first image corresponding to the left eye of the user of the image display device and the second image corresponding to the right eye of the user of the image display device displayed according to a particular screen scheme, and here, the 3D effect may be implemented as an image depth corresponding to the 3D image is generated on the basis of a difference between viewing angles of the user with respect to the first image and the second image generated through spaces between the patterns corresponding to the parallax barrier.

Also, the particular screen display scheme may be at least one of a landscape image display scheme in which a width of an image in a horizontal direction is greater than a height of the image in a vertical direction, or a portrait image display scheme of the reverse.

In an embodiment of the present invention, the event may be a rotation of the image display device 200.

In this case, the control unit 210 may change the disposition direction of the parallax barrier and the rendering scheme corresponding to the 3D image on the basis of the rotation of the image display device 200. Here, the rotation of the image display device 200 may be a rotation of a longer axis of the image display device 200 from any one of a first direction horizontal to the line connecting both eyes of the user of the image display device 200 and a second direction perpendicular to the line connecting the both eyes of the user to a different direction.

Also, when the image display device 200 is rotated from the first direction to the second direction, the control unit may change a direction of the parallax barrier from a direction perpendicular to the longer axis of the image display device to a direction horizontal to the longer axis of the image display device.

Also, when the display device 200 is rotated from the second direction to the first direction, the control unit 210 may change the direction of the parallax barrier from the direction parallel to the longer axis of the image display device to the direction perpendicular to the longer axis of the image display device.

Also, when the display device 200 is rotated from the second direction to the first direction, the control unit 210 may change the direction of the parallax barrier from the direction parallel to the longer axis of the image display device 200 to the direction perpendicular to the longer axis of the image display device.

Also, in another embodiment of the present invention, the 3D image may include a first image corresponding to the left eye of the user of the image display device 200 and a second image corresponding to the right eye of the user of the image display device 200.

Here, the first image and the second image may be displayed on the screen such that they are spaced apart from one another in the first direction by an image depth corresponding to the 3D image.

In this case, when a rotation of the image display device is sensed, the control unit 210 changes the rendering scheme on the basis of a previously determined display scheme corresponding to the image display device. In this case, when the display scheme of the image display device is a screen conversion mode, the control unit 210 may change the rendering scheme such that the first image and the second image are rotated in a direction opposite to the rotation direction of the image display device, so as to be displayed, and when the display scheme of the image display device is a screen non-conversion mode, the control unit 210 may change the rendering scheme such that the first image and the second image are kept to be spaced apart from one another in the first direction so as to be displayed on the screen.

The function of changing the screen display direction of the image display device 200 in the case in which the event is a rotation of the image display device 200 will be described in detail with reference to FIGS. 5 and 8.

In another embodiment of the present invention, the event may be a touch and a drag event on the basis of the touch.

In this case, the control unit 210 may change a disposition direction of the parallax barrier and the rendering scheme corresponding to the 3D image on the basis of the touch and the drag event.

Also, the touch and the drag event may include a first touch and a first drag event rotating on the screen on the basis of the first touch.

In this case, the control unit 210 may change the disposition direction of the parallax barrier and the rendering scheme corresponding to the 3D image on the basis of a rotation direction of the first drag event.

Also, the control unit 210 may change a disposition direction of the parallax barrier such that the parallax barrier is continuously disposed to be perpendicular to the line connecting the both eyes of the user of the image display device 200 on the basis of the rotation direction of the first drag event.

Here, the 3D image may include a first image corresponding to the left eye of the user of the image display device 200 and a second image corresponding to the right eye of the user, and the first image and the second image may be displayed on the screen such that they are spaced apart in a third direction horizontal to the line connecting both eyes of the user of the image display device by an image depth corresponding to the 3D image.

In this case, when the first drag event is sensed, the control unit 210 may change the rendering scheme on the basis of a previously determined display scheme corresponding to the image display device.

Also, when the display scheme of the image display device is a screen conversion mode, the control unit 210 may change the rendering scheme such that the first image and the second image are rotated in a direction opposite to a rotation direction of the first drag event.

Also, when the display scheme of the image display device is a screen non-conversion mode, the control unit 210 may change the rendering scheme such that the first image and the second image are continuously displayed to be spaced apart in the third direction on the screen.

Also, in an embodiment of the present invention, the touch and the drag event may include a second touch, a second drag event on the basis of the second touch, and a third touch and a third drag event rotating on the screen on the basis of the third touch.

In this case, the control unit 210 may divide the screen into a first region and a second region on the basis of the second drag event.

Also, the control unit 210 may change a disposition direction of a parallax barrier corresponding to any one of the first region and the second region and a rendering scheme of an image on the basis of the rotation direction of the third drag event.

Also, here, the any one region may be a region in which the third touch has been applied among the first region and the second region.

Also, according to an embodiment of the present invention, an image corresponding to any one region may include a third image corresponding to the left eye of the user of the image display device and a fourth image corresponding to the right eye of the user.

In this case, when the third drag event is sensed, the control unit 210 may change a rendering scheme corresponding to the any one region on the basis of a previously determined display scheme corresponding to the image display device such that the third image and the fourth image are rotated to be displayed in a direction opposite to a rotation direction of the third drag event.

The function of changing the screen display direction of the image display device 200 in the case in which the event is a touch and the drag event will be described in detail with reference to FIGS. 6 through 8.

Also, according to another embodiment of the present invention, when the image display device 200 does not provide a function in relation to a change of the disposition direction of the parallax barrier and a change in the rendering scheme corresponding to the 3D image, the control unit 210 may control the display unit 230 to change the 3D image into a 2D image and display the same.

A method for changing the 3D image into a 2D image on the basis of the event will be described in detail with reference to FIGS. 9a, 9b and 10.

The sensing unit 220 may serve to sense an event in relation to the image display device 200.

According to an embodiment of the present invention, the event may be an event in relation to a change in a disposition direction of the parallax barrier and a change in a rendering scheme corresponding to the 3D image.

For example, the event may be a rotation of the image display device 200.

Here, the rotation of the image display device 200 may be a rotation of a longer axis of the image display device 20 from any one of a first direction horizontal to a line connecting both eyes of the user of the image display device 200 and a second direction perpendicular to the line connecting the both eyes of the user to a different direction.

Also, when the image display device 200 is rotated by the user of the image display device 200, the image display device 200 may be required to change an image from any one of a landscape image in which a width in a horizontal direction is greater than a height thereof in a vertical direction and a portrait image display scheme of the reverse to the other. Thus, the event of rotation of the image display device 200 may be related to a change in a disposition direction of the parallax barrier and a change in a rendering scheme corresponding to the 3D image.

Also, for example, the event may be a touch and a drag event on the basis of the touch that may be generated on the screen of the image display device 200.

In this case, the image display device 200 may be required to change an image from any one of a landscape image in which a width thereof in a horizontal direction is greater than a height thereof in a vertical direction and a portrait image of the reverse to the other on the basis of the touch and the drag event on the basis of the touch. Thus, the touch and the drag event on the basis of the touch may be related to a change in the disposition direction of the parallax barrier and a change in the rendering scheme corresponding to the 3D image.

It is obvious to a skilled person in the art that various events in relation to a change in the disposition direction of the parallax barrier and a change in the rendering scheme corresponding to the 3D image are applicable to the image display device or the image display method disclosed in the present disclosure.

The sensing unit 220 may include at least one sensor module for sensing various events in relation to a change in the disposition direction of the parallax barrier and a change in the rendering scheme corresponding to the 3D image.

Also, the sensing unit 220 may include at least one sensor module formed at a predetermined position of the image display device 200.

For example, when the image display device 200 is implemented in the form of a mobile terminal, the at least one sensor module may be provided in a bezel region of the mobile terminal, and sense a touch input (including a proximity touch) on the bezel region, a change in an illumination value in the bezel region, and the like.

In this case, the at least one sensor module may include a touch sensor, a proximity sensor, an illumination sensor, and the like. Also, the sensing unit 220 may sense a touch time (or a touch duration) according to the touch input.

Also, when the mobile terminal has borderless characteristics, the sensing unit 220 may include one or more sensor modules provided in a certain position (a front surface, a lateral surface, a rear surface, or the like) of the mobile terminal. In this case, the borderless region of the mobile terminal may include a remaining touch region excluding a bezel region provided in the mobile terminal or a touch region previously set according to an application program, or the like, among the display region of the screen of the image display device 200.

Here, the remaining touch region excluding the touch region previously set according to an application program, or the like, may refer to a region not performing a certain operation or function corresponding to a touch input.

Also, the sensing unit 220 may include a motion recognition sensor provided in a predetermined position of the image display device 200 and sensing a motion of the image display device 200.

In this case, the motion recognition sensor may include a sensor such as a sensor for recognizing a motion or a position of an object, a geomagnetism sensor, an acceleration sensor, a gyro sensor, an inertial sensor, an altimeter, a vibration sensor, and may additionally include sensors in relation to motion recognition.

Also, the sensing unit 220 may sense information including a motion of the image display device 200. For example, the sensing unit 220 may sense information including a direction in which the image display device 200 is sloped, an angle at which the image display device 200 is sloped, and/or a speed at which the image display device 200 is sloped, a vibration direction in a vertical, horizontal diagonal direction, or the like, and/or a number of vibrations, and the like. Through this, the sensing unit 220 may sense an event of a rotation of the image display device 200.

Here, the sensed information (a direction in which the image display device 200 is sloped, an angle at which the image display device 200 is sloped, and/or a speed at which the image display device 200 is sloped, a vibration direction, and/or a number of vibrations) may be digitalized through digital signal processing, and the digitalized information may be input to the control unit 210.

Also, according to another embodiment of the present invention, the sensing unit 220 (which includes the at least one sensor module) may be provided in the display unit 230. For example, in a case in which the event is a touch and a drag event on the basis of the touch, the touch and the drag event on the basis of the touch may be sensed by a touch sensor provided in the display unit 230.

The display unit 230 may serve to display (or output) information processed in the image display device 200. The information may be displayed on or output to a particular screen.

Also, when the image display device 200 performs a particular function, the display unit 230 may display a user interface (UI) or a graphic user interface (GUI) in relation to the particular function.

According to an embodiment disclosed in the present disclosure, the display unit 230 may display 3D contents (or a 3D image) provided by the image display device 200. Also, the display unit 230 may display various graphic objects such as a 3D image, a 3D object, or the like, included in the 3D contents.

The display unit 230 may include at least one of a liquid crystal display (LCD), a thin film transistor-LCD (TFT-LCD), an organic light emitting diode (OLED) display, a flexible display, a three-dimensional (3D) display, and an e-ink display.

Some of these displays may be configured as transparent or light-transmissive displays through which a user may see the outside. These displays may be called transparent displays. A representative example of the transparent displays may be a transparent OLED (TOLED), and the like. The rear structure of the display unit 230 may also be configured as a light-transmissive structure. Through such a structure, the user can see an object positioned at the rear of the body of the display device through an area occupied by the display unit 230.

Various types of visual information may be displayed on the display unit 230. The information may be displayed in the form of character, number, symbol, graphic, icon, or the like, and may be configured as a 3D stereoscopic image.

The display unit 230 may be operated as a whole region or may be divided into a plurality of regions so as to be accordingly operated. In the latter case, the plurality of regions may be operated in association with each other.

For example, an output window and an input window may be displayed at upper and lower portions of the display unit 230, respectively. Soft keys including numbers for inputting a phone number, or the like, may be output to the input window. When a soft key is touched, a number corresponding to the touched soft key is displayed on the output window. When the manipulation unit is manipulated, a call connection with respect to a phone number displayed on the output window is attempted, or text displayed on the output window may be input to an application.

The display unit 230 may be configured to receive a touch through scrolling. The user may move a cursor or a pointer positioned on an entity, e.g., an icon, or the like, displayed on the display unit 230 by scrolling the display unit 230. In addition, when the user moves his finger on the display unit 230, a path along which the user's finger moves may be visually displayed on the display unit 230. This will be useful in editing an image displayed on the display unit 230.

The display unit 230 may include a touch screen. For example, one function of the image display device 200 may be executed in a case in which the touch screen of the display unit 230 is touched in conjunction within a certain time range. The touch in conjunction may be clamping the body of the image display device 200 with the user's thumb and index finger. The one function may be, for example, activation or deactivation of the display unit 230.

The memory unit 240 may play a role of storing information processed in the image display device 200.

According to an embodiment of the present disclosure, the memory unit 240 may store 3D contents provided by the image display device 200. In detail, the memory unit 240 may store a 3D image or a 3D object included in the 3D contents and store depth information regarding the 3D image or the 3D object, and the like. Also, when the 3D image or the 3D object is processed by the control unit 210, the memory unit 240 may store the processing results.

Also, the memory unit 240 may store various user interfaces and/or graphic user interfaces in relation to functions performed by the image display device 200.

Also, the memory unit 240 stores data, programs, and the like, required for the image display device 200 to operate.

The memory unit 240 may include at least one type of storage medium including a flash memory, a hard disk type, a multimedia card micro type, a card-type memory (e.g., SD or XD memory, etc), a magnetic memory, a magnetic disk, an optical disk, a random access memory (RAM), a static random access memory (SRAM), a read-only memory (ROM), an electrically erasable programmable read-only memory (EEPROM), a programmable read-only memory (PROM), and an SSD (Solid State Disk). Also, the image display device 200 may operate a web storage performing a storage function of the memory unit 240 on the Internet, or may be operated in relation to the web storage device.

An Image Display Method According to Embodiments Disclosed in the Present Disclosure An image display method for providing a 3D image according to a glass-free scheme on the basis of binocular disparity according to embodiments disclosed in the present disclosure may include: displaying a 3D image on a screen of an image display device; detecting whether an event in relation to a change in a disposition direction of a parallax barrier and a change in a rendering scheme corresponding to the 3D image occurs; and changing the disposition direction of the parallax barrier and the rendering scheme corresponding to the 3D image on the basis of the event.

According to an embodiment of the present invention, the event may be a rotation of the image display device, and the rotation may be a rotation from one of a first direction in which a longer axis of the display device is horizontal to a line connecting both eyes of a user of the display device and a second direction in which the longer axis of the display device is perpendicular to the line connecting both eyes of the user, to the other direction, wherein the method may further include: detecting a rotation direction of the image display device, wherein the changing of the disposition direction of the parallax barrier and the rendering scheme corresponding to the 3D image may include: changing a direction of the parallax barrier from a direction perpendicular to the longer axis of the image display device to a direction horizontal to the longer axis of the image display device when the image display device is rotated from the first direction to the second direction, and changing a direction of the parallax barrier from the direction parallel to the longer axis of the image display device to the direction perpendicular to the longer axis of the image display device when the image display device is rotated from the second direction to the first direction.

Also, according to another embodiment of the present invention, the event may be a first touch and a first drag event rotated on the screen on the basis of the first touch, and the changing of a disposition direction of the parallax barrier and a rendering scheme corresponding to the 3D image may include changing a disposition direction of the parallax barrier and a rendering scheme corresponding to the 3D image on the basis of a rotation direction of the first drag event.

Also, according to another embodiment of the present invention, the method may further include: detecting whether the display device provides a function in relation to a change in a disposition direction of the parallax barrier or a change in the rendering scheme corresponding to the 3D image; and when the image display device does not provide a function relation to the change, changing a 3D image into a 2D image on the basis of the event and displaying the 2D image.

FIG. 4 is a flow chart illustrating a process of a method for controlling a terminal according to embodiments disclosed in the present disclosure.

Referring to FIG. 4, the image display method according to embodiments disclosed in the present disclosure may include the following steps.

First, the image display device according to embodiments disclosed in the present disclosure may display a 3D image on a screen thereof (S110).

Next, the image display device may determine whether an event in relation to a change in a disposition direction of the parallax barrier and a change in a rendering scheme corresponding to the 3D image (or may sense the event) (S120).

And then, when an event has occurred, the image display device may change the disposition direction of the parallax barrier and the rendering scheme corresponding to the 3D image on the basis of the event (S130).

First Embodiment—Changing Screen on the Basis of Rotation of Image Display Device Disclosed in the Present Disclosure The first embodiment disclosed in the present disclosure may be implemented by some of the elements and steps included in the embodiments as described above or a combination thereof, or may be implemented by a combination of the embodiments, and hereinafter, repeated parts may be omitted to clarify the first embodiment disclosed in the present disclosure.

The image display device according to the first embodiment disclosed in the present disclosure may provide a glass-free 3D image on the basis of a parallax barrier scheme, and may include a display unit configured to display a 3D image on a screen, a sensing unit configured to sense whether an event in relation to a change in a disposition direction of the parallax barrier and a change in a rendering scheme corresponding to the 3D image, and a control unit configured to change the disposition direction of the parallax barrier and the rendering scheme corresponding to the 3D image on the basis of the event.

Here, the disposition direction of the parallax barrier may be a direction perpendicular to a line connecting both eyes of a user of the image display device.

Also, the rendering scheme is a scheme implementing a 3D effect on the basis of a first image corresponding to a left eye of the user of the image display device and a second image corresponding to a right eye of the user of the image display device displayed according to a particular screen display scheme, wherein the 3D effect is implemented as an image depth corresponding to the 3D image is generated on the basis of a difference between viewing angles of the user with respect to the first image and the second image generated through a space between patterns corresponding to the parallax barrier.

Also, the particular screen display scheme may be at least one of a landscape image display scheme in which a width of a landscape image in a horizontal direction is greater than a height thereof in a vertical direction and a portrait image display scheme of the reverse.

According to the first embodiment of the present disclosure, the event may be a rotation of the image display device, and the control unit may change a disposition direction of the parallax barrier and a rendering scheme corresponding to the 3D image on the basis of the rotation of the image display device, and in this case, the rotation of the image display device may be a rotation of a longer axis of the image display device from any one of a first direction horizontal to the line connecting both eyes of the user of the image display device and a second direction perpendicular to the line connecting the both eyes of the user to a different direction.

Also, according to the first embodiment of the present disclosure, when the image display device is rotated from the first direction to the second direction, the control unit may change a direction of the parallax barrier from a direction perpendicular to the longer axis of the image display device to a direction horizontal to the longer axis of the image display device, and when the display device is rotated from the second direction to the first direction, the control unit may change the direction of the parallax barrier from the direction parallel to the longer axis of the image display device to the direction perpendicular to the longer axis of the image display device.

FIGS. 5a to 5c are views illustrating operations of an image display device according to a first embodiment disclosed in the present disclosure.

Referring to FIG. 5a, the image display device 200 may provide a glass-free 3D image 40 on the basis of a parallax barrier 50 scheme.

As described above, on the basis of the parallax barrier 50, the image display device 200 may provide a 3D effect corresponding to the 3D image on the basis of a difference between viewing angles of the user of the image display device 200 generated between the first image 41 and the second image 42 included in the 3D image 40 positioned behind the parallax barrier 50.

For example, the first image 41 may be an image corresponding to the left eye of the user, and the second image 42 may be an image corresponding to the right eye of the user.

In this case, the image display device 200 may display the 3D image according to a particular screen display scheme. The particular screen display scheme may be at least one of a landscape image display scheme in which an image in a horizontal direction is greater than a height thereof in a vertical direction and a portrait image display scheme of the reverse. For example, FIG. 5a illustrates the case in which the particular screen display scheme is the landscape image display scheme.

FIG. 5b illustrates a state in which the user has rotated an existing image display device 10 from the first direction (a direction horizontal to the line connecting both eyes of the user) to the second direction (a direction perpendicular to the line connecting both eyes of the user).

In this case, the display direction of the parallax barrier 50a or the 3D image 40a (or the rendering scheme with respect to the 3D image) is not changed, so the user may not be able to properly recognize (or view) the 3D image 40a visually.

FIG. 5c illustrates a state in which the user has rotated the image display device 200 from the first direction (the direction horizontal to the line connecting both eyes of the user) to the second direction (the direction perpendicular to the line connecting both eyes of the user).

In this case, when the image display device 200 is rotated by the user, the image display device 200 may change a disposition direction of the parallax barrier 50b or a display direction of the 3D image 40b (or a rendering scheme with respect to the 3D image).

For example, the image display device 200 may change the disposition direction of the parallax barrier 50b from the direction perpendicular to the longer axis of the image display device 200 to the direction horizontal to the longer axis of the image display device 200, and the display direction of the 3D image 40b (or the rendering scheme corresponding to the 3D image 40b) from the landscape image display scheme to the portrait image display scheme.

Thus, since the display direction of the parallax barrier 50b or the 3D image (or the rendering scheme with respect to the 3D image 40b) has been changed, the user can visually properly recognize (or view) the 3D image 40b.

In FIG. 5, the case in which the user has rotated the image display device 200 from the first direction to the second direction is illustrated, but even in the reverse case (i.e., in the case in which the image display device 200 is rotated from the second direction to the first direction), the display direction of the parallax barrier and the 3D image of image display device 200 may be changed.

For example, when the user has rotated the image display device 200 from the second direction to the first direction, the image display device 200 may change the direction of the parallax barrier from the direction horizontal to the longer axis of the image display device 200 to the direction perpendicular to the longer axis of the image display device 200, and may also change the display direction (or the rendering scheme) of the 3D image 40*b* such that it corresponds to the direction of the changed parallax barrier.

Also, since the 3D image 40*b* includes the first image corresponding to the left eye of the user of the image display device 200 and the second image corresponding to the right eye of the user of the image display device 200, the display directions of the first image and the second image may be changed.

Second Embodiment—Changing Screen on the Basis of Touch and Drag According to Touch The second embodiment disclosed in the present disclosure may be implemented by some of the elements and steps included in the embodiments as described above or a combination thereof, or may be implemented by a combination of the embodiments, and hereinafter, repeated parts may be omitted to clarify the second embodiment disclosed in the present disclosure.

The image display device according to the second embodiment disclosed in the present disclosure may provide a glass-free 3D image on the basis of a parallax barrier scheme, and may include a display unit configured to display a 3D image on a screen, a sensing unit configured to sense whether an event in relation to a change in a disposition direction of the parallax barrier and a change in a rendering scheme corresponding to the 3D image, and a control unit configured to change the disposition direction of the parallax barrier and the rendering scheme corresponding to the 3D image on the basis of the event.

Here, the disposition direction of the parallax barrier may be a direction perpendicular to a line connecting both eyes of a user of the image display device.

Also, the rendering scheme is a scheme implementing a 3D effect on the basis of a first image corresponding to a left eye of the user of the image display device and a second image corresponding to a right eye of the user of the image display device displayed according to a particular screen display scheme, wherein the 3D effect is implemented as an image depth corresponding to the 3D image is generated on the basis of a difference between viewing angles of the user with respect to the first image and the second image generated through a space between patterns corresponding to the parallax barrier.

Also, the particular screen display scheme may be at least one of a landscape image display scheme in which a width of a landscape image in a horizontal direction is greater than a height thereof in a vertical direction and a portrait image display scheme of the reverse.

According to the second embodiment of the present disclosure, the event may be a touch and a drag event on the basis of the touch, and the control unit may change a disposition direction of the parallax barrier and a rendering scheme corresponding to the 3D image on the basis of the touch and the drag event.

Also, according to the second embodiment of the present disclosure, the touch and the drag event may include a first touch and a first drag event rotating on the screen on the basis of the first touch, and the control unit may change the disposition direction of the parallax barrier and the rendering scheme corresponding to the 3D image on the basis of a rotation direction of the first drag event.

Also, according to the second embodiment of the present disclosure, the control unit may change a disposition direction of the parallax barrier such that the parallax barrier is continuously disposed to be perpendicular to the line connecting the both eyes of the user of the image display device on the basis of the rotation direction of the first drag event.

Also, according to the second embodiment of the present disclosure, the touch and the drag event may include a second touch, a second drag event on the basis of the second touch, and a third touch and a third drag event rotating on the screen on the basis of the third touch, wherein the control unit may divide the screen into a first region and a second region on the basis of the second drag event, and change a disposition direction of a parallax barrier corresponding to any one of the first region and the second region and a rendering scheme of an image on the basis of the rotation direction of the third drag event.

Here, the any one region may be a region in which the third touch has been applied among the first region and the second region.

Also, an image corresponding to any one region may include a third image corresponding to the left eye of the user of the image display device and a fourth image corresponding to the right eye of the user, wherein when the third drag event is sensed, the control unit may change a rendering scheme corresponding to the any one region on the basis of a previously determined display scheme corresponding to the image display device such that the third image and the fourth image are rotated to be displayed in a direction opposite to a rotation direction of the third drag event.

FIGS. 6*a* to 6*c* are views illustrating operations of an image display device according to the second embodiment disclosed in the present disclosure.

Referring to FIG. 6*a*, the image display device 200 may provide the glass-free 3D image 40 on the basis of the parallax barrier 50 scheme.

In this case, the image display device 200 may display the 3D image according to a particular screen display scheme. The particular screen display scheme may be at least one of a landscape image display scheme in which an image in a horizontal direction is greater than a height thereof in a vertical direction and a portrait image display scheme of the reverse. For example, FIG. 6*a* illustrates the case in which the particular screen display scheme is the landscape image display scheme.

Referring to FIG. 6*b*, the user of the image display device 200 may apply a first touch T110 input to the screen of the image display device 200, and perform a drag operation on the screen on the basis of the first touch T110 input to generate a first drag event L110.

In this case, the sensing unit 220 of the image display device 200 may sense the first touch T110 and the first drag event L110.

The image display device 200 (or the controller 210) may change a disposition direction of a parallax barrier 50*c* or a display direction of the 3D image 40*c* (or a rendering scheme corresponding to the 3D image) on the basis of the sensed rotation direction of the first drag event L110.

For example, when the image display device 200 has been rotated from the first direction horizontal to the line connecting both eyes of the user to the second direction perpendicular to the line connecting both eyes of the user, the image display device 200 may change the disposition direction of the parallax barrier 50*c* from the direction perpendicular to the longer axis of the image display device 200 to the direction horizontal to the longer axis of the image display device 200, and the display direction of the 3D image 40c (or the rendering scheme corresponding to the 3D image 40c) from the landscape image display scheme to the portrait image display scheme.

Also, for example, when the image display device 200 has been rotated from the second direction to the first direction, the image display device 200 may change the disposition direction of the parallax barrier 50c from the direction horizontal to the longer axis of the image display device 200 to the direction perpendicular to the longer axis of the image display device 200 and change the display direction of the 3D image 40c (or the rendering scheme corresponding to the 3D image 40c) from the portrait image display scheme to the landscape image display scheme.

Referring to FIG. 6c, the user of the image display device 200 may apply two touches T120 and T130 input to the screen of the image display device 200, and may perform a drag operation on the screen on the basis of the two touches T120 and T130 input to generate a rotating drag event L120.

In this case, the sensing unit 220 of the image display device 200 may sense the two touches T120 and T130 and the rotating drag event L120.

The image display device 200 (or the controller 210) may change the direction of a parallax barrier 50d of the image display device 200 and the display direction of the 3D image 40d (or the rendering scheme corresponding to the 3D image) on the basis of the rotation direction of the sensed rotating drag event L120.

For example, when the image display device 200 is rotated from the first direction horizontal to the line connecting both eyes of the user to the second direction perpendicular to the line connecting both eyes of the user, the image display device 200 may change the disposition direction of the parallax barrier 50d from the direction perpendicular to the longer axis of the image display device 200 to the direction horizontal to the longer axis of the image display device 200, and change the display direction of the 3D image 40d (or the rendering scheme corresponding to the 3D image 40d) from the landscape image display scheme to the portrait image display scheme.

Also, for example, when the image display device 200 is rotated from the second direction to the first direction, the image display device 200 may change the disposition direction of the parallax barrier 50d from the direction horizontal to the longer axis of the image display device 200 to the direction perpendicular to the longer axis of the image display device 200, and change the display direction of the 3D image 40d (or the rendering scheme corresponding to the 3D image 40d) from the portrait image display scheme to the landscape image display scheme.

Also, since the 3D image 40b includes the first image corresponding to the left eye of the user of the image display device 200 and the second image corresponding to the right eye of the user of the image display device 200, the display directions of the first image and the second image may be changed.

The screen display method as described above with reference to FIGS. 6a to 6c may be for changing the disposition direction of the parallax barrier such that the disposition direction of the parallax barrier is continuously disposed to be perpendicular to the line connecting both eyes of the user of the image display device.

FIGS. 7a to 7d are views illustrating operations of an image display device according to the second embodiment disclosed in the present disclosure.

Referring to FIG. 7a, the image display device 200 may provide the glass-free 3D image 40 on the basis of the parallax barrier 50 scheme.

In this case, the image display device 200 may display the 3D image according to a particular screen display scheme. The particular screen display scheme may be at least one of a landscape image display scheme in which an image in a horizontal direction is greater than a height thereof in a vertical direction and a portrait image display scheme of the reverse. For example, FIG. 7a illustrates the case in which the particular screen display scheme is the landscape image display scheme.

Referring to FIG. 7b, the image display device 200 (or the sensing unit 220) may sense a second touch T210 and a second drag event L210 on the basis of the second touch T210.

In this case, the image display device 200 (or the controller 210) may divide the screen of the image display device 200 into a first region R110 and a second region R120 on the basis of the second drag event L210.

Referring to FIG. 7c, the sensing unit 220 may sense a third touch T310 and a third drag event L310 rotated on the screen on the basis of the third touch T310.

In this case, the controller 210 may change a disposition direction of the parallax barrier corresponding to any one of the first region R110 and the second region R120 and a rendering scheme on the basis of the rotation direction of the third drag event L310.

Here, the any one region may be a region in which the third touch T310 has been applied, among the first region R110 and the second region R120.

For example, like the case of FIG. 7c, the image display device 200 may change a disposition direction of a parallax barrier 50' corresponding to the second region R120 to which the third touch T310 input has been applied and a rendering scheme of an image 40'.

Referring the FIG. 7d, a resultant screen after the rotation is illustrated.

It can be confirmed that the disposition direction of a parallax barrier 50e corresponding to the second region R120 is a direction horizontal to the longer axis of the image display device 200, and a screen display direction (e.g., a vertical direction) of an image 40e corresponding to the second region R120 has also been changed accordingly.

Also, since the 3D image 40e includes the third image corresponding to the left eye of the user of the image display device 200 and the fourth image corresponding to the right eye of the user of the image display device 200, the display directions of the third image and the fourth image may be changed.

Third Embodiment—Image Display Method in Screen Non-Conversion Mode

The third embodiment disclosed in the present disclosure may be implemented by some of the elements and steps included in the embodiments as described above or a combination thereof, or may be implemented by a combination of the embodiments, and hereinafter, repeated parts may be omitted to clarify the third embodiment disclosed in the present disclosure.

The image display device according to the third embodiment disclosed in the present disclosure may provide a glass-free 3D image based on a parallax barrier scheme, and may include a display unit configured to display a 3D image on a screen, a sensing unit configured to sense whether an event in relation to a change in a disposition direction of the parallax barrier and a change in a rendering scheme corresponding to the 3D image, and a controller configured to change the disposition direction of the parallax barrier and the rendering scheme corresponding to the 3D image on the basis of the event.

Here, the disposition direction of the parallax barrier may be a direction perpendicular to the line connecting both eyes of the user of the image display device.

Also, the rendering scheme may be a scheme implementing a 3D effect on the basis of a first image corresponding to the left eye of the user of the image display device displayed in a particular screen display scheme and a second image corresponding to the right eye of the user, and here, the 3D effect may be implemented as an image depth corresponding to the 3D image is generated on the basis of a difference between viewing angles of the user with respect to the first image and the second image generated through a space between patterns corresponding to the parallax barrier.

Also, the particular screen display scheme may be at least one of a landscape image display scheme in which a width of a landscape image in a horizontal direction is greater than a height thereof in a vertical direction and a portrait image display scheme of the reverse.

According to the third embodiment of the present invention, the event may be a rotation of the image display device, the control unit may change a disposition direction of the parallax barrier and a rendering scheme corresponding to the 3D image on the basis of a rotation of the image display device, and the rotation of the image display device may be a rotation of a longer axis of the image display device from any one of a first direction horizontal to the line connecting both eyes of the user of the image display device and a second direction perpendicular to the line connecting the both eyes of the user to a different direction.

Also, the 3D image may include a first image corresponding to the left eye of the user of the image display device and a second image corresponding to the right eye of the user of the image display device.

Also, the first image and the second image may be displayed on the screen such that they are spaced apart from one another in the first direction by an image depth corresponding to the 3D image.

In this case, when a rotation of the image display device is sensed, the control unit may change the rendering scheme on the basis of a previously determined display scheme corresponding to the image display device, wherein when the display scheme of the image display device is a screen conversion mode, the control unit may change the rendering scheme such that the first image and the second image are rotated in a direction opposite to the rotation direction of the image display device, so as to be displayed, and when the display scheme of the image display device is a screen non-conversion mode, the control unit may change the rendering scheme such that the first image and the second image are kept to be spaced apart from one another in the first direction so as to be displayed on the screen.

According to the third embodiment of the present invention, the event may be a touch and a drag event on the basis of the touch, and the control unit may change a disposition direction of the parallax barrier and the rendering scheme corresponding to the 3D image on the basis of the touch and the drag event.

Also, the touch and the drag event may include a first touch and a first drag event rotating on the screen on the basis of the first touch, and the control unit may change the disposition direction of the parallax barrier and the rendering scheme corresponding to the 3D image on the basis of a rotation direction of the first drag event.

Also, the 3D image may include a first image corresponding to the left eye of the user of the image display device and a second image corresponding to the right eye of the user.

Also, the first image and the second image may be displayed on the screen such that they are spaced apart spaced apart in a third direction horizontal to the line connecting both eyes of the user of the image display device by an image depth corresponding to the 3D image.

In this case, when the first drag event is sensed, the control unit may change the rendering scheme on the basis of a previously determined display scheme corresponding to the image display device, wherein when the display scheme of the image display device is a screen conversion mode, the control unit may change the rendering scheme such that the first image and the second image are rotated in a direction opposite to a rotation direction of the first drag event, and when the display scheme of the image display device is a screen non-conversion mode, the control unit may change the rendering scheme such that the first image and the second image are continuously displayed to be spaced apart in the third direction on the screen.

FIGS. 8a to 8c are views illustrating operations of an image display device according to a third embodiment disclosed in the present disclosure.

FIG. 8a illustrates a case in which a display scheme of the image display device 200 supports a screen conversion mode.

Referring to the left drawing of FIG. 8a, the image display device 200 may provide a glass-free 3D image based on a parallax barrier scheme.

In this case, the 3D image may include a first image d110 corresponding to the left eye of the user of the image display device 200 and a second image d120 corresponding to the right eye of the user.

When an event in relation to a disposition direction of the parallax barrier and a change in a rendering scheme corresponding to the 3D image occurs, the image display device 200 may operate to change a screen display direction of the 3D image in the screen conversion mode (or the screen change mode).

In the case in which the image display device 200 supports the screen conversion mode, when the event is sensed, the image display device 200 may change a disposition direction of the parallax barrier and a rendering scheme corresponding to the 3D image on the basis of the event.

For example, as illustrated in FIG. 8a, the image display device 200 may change the disposition direction of the parallax barrier from the direction perpendicular to the longer axis of the image display device 200 to the direction horizontal to the longer axis of the image display device 200.

Also, the image display device 200 may change the screen display direction of the first image d110 and the second image d120 from the direction perpendicular to the longer axis of the image display device 200 to the direction horizontal to the longer axis of the image display device 200, thus changing the rendering scheme corresponding to the 3D image.

FIG. 8b shows a problem arising when the existing image display device 200a operates in a screen non-conversion mode.

When an event in relation to a disposition direction of the parallax barrier and a change in a rendering scheme corresponding to the 3D image occurs, the image display device

200 may operate not to change a screen display direction of the 3D image in the screen non-conversion mode (or the screen non-change mode).

When an event in relation to a disposition direction of the parallax barrier and a change in a rendering scheme corresponding to the 3D image occurs, the image display device 200a may change the first image d110 and the second image d120 into images d310 and d320 disposed to be spaced apart one another in a vertical direction and display the same as shown in FIG. 8b.

Thus, the user of the image display device 200 cannot properly visually recognize a 3D effect with respect to the 3D image.

FIG. 8c illustrates an operation in the screen non-conversion mode of an image display device 200b according to a third embodiment of the present invention.

The image display device 200b may change the display direction and position such that the first image d110 and the second image d120 are disposed to be continuously spaced apart from one another in the horizontal direction. Namely, the image display device 200b may change the first image d110 and the second image d120 into images d410 and d420 having changed display direction and position (please see the right drawing in FIG. 8c).

In this case, the user of the image display device 200 can continuously visually recognize the 3D effect with respect to the 3D image.

Fourth Embodiment—2D Screen Mode

The fourth embodiment disclosed in the present disclosure may be implemented by some of the elements and steps included in the embodiments as described above or a combination thereof, or may be implemented by a combination of the embodiments, and hereinafter, repeated parts may be omitted to clarify the fourth embodiment disclosed in the present disclosure.

The image display device according to the fourth embodiment disclosed in the present disclosure may provide a glass-free 3D image based on a parallax barrier scheme, and may include a display unit configured to display a 3D image on a screen, a sensing unit configured to sense whether an event in relation to a change in a disposition direction of the parallax barrier and a change in a rendering scheme corresponding to the 3D image, and a controller configured to change the disposition direction of the parallax barrier and the rendering scheme corresponding to the 3D image on the basis of the event.

Here, the disposition direction of the parallax barrier may be a direction perpendicular to a line connecting both eyes of a user of the image display device.

Also, the rendering scheme is a scheme implementing a 3D effect on the basis of a first image corresponding to a left eye of the user of the image display device and a second image corresponding to a right eye of the user of the image display device displayed according to a particular screen display scheme, wherein the 3D effect is implemented as an image depth corresponding to the 3D image is generated on the basis of a difference between viewing angles of the user with respect to the first image and the second image generated through a space between patterns corresponding to the parallax barrier.

Also, the particular screen display scheme may be at least one of a landscape image display scheme in which a width of a landscape image in a horizontal direction is greater than a height thereof in a vertical direction and a portrait image display scheme of the reverse.

According to the fourth embodiment of the present invention, when the image display device does not provide a function in relation to a change in a disposition direction of the parallax barrier or a change in a rendering scheme corresponding to the 3D image, the controller may control the display unit to change the 3D image into a 2D image and display the same.

FIGS. 9a and 9b are views illustrating operations of an image display device according to the fourth embodiment disclosed in the present disclosure.

Also, FIGS. 9a and 9b show the case in which the image display device 200 does not provide a function in relation to a change in a disposition direction of the parallax barrier or a change in a rendering scheme corresponding to the 3D image.

Referring to FIG. 9a, the image display device 200 may provide a glass-free 3D image I100 based on a parallax barrier scheme.

An event in relation to a change in a disposition direction of the parallax barrier or a change in a rendering scheme corresponding to the 3D image I110 occurs, the controller 210 of the image display device 200 may control the display unit 230 to change the 3D image I110 into a 2D image 1120 and display the same (please see FIG. 9b).

FIG. 10 is a flow chart illustrating an image display method according to the fourth embodiment disclosed in the present disclosure.

Also, FIG. 10 illustrates an example in which the image display device 200 displays 3D contents.

Referring to FIG. 10, the image display method according to the fourth embodiment disclosed in the present disclosure may include the following steps.

First, the image display device 200 may sense a change in the direction thereof (S210).

Next, the image display device 200 may determine whether a 3D mode is supported in the current direction (S220).

And then, when the image display device 200 supports the 3D mode, the image display device 200 may change a setting thereof into a setting for supporting the 3D mode (S230).

Thereafter, the image display device 200 may display the 3D contents in the 3D mode on the screen thereof (S240).

Also, when the image display device 200 does not support the 3D mode, the image display device 200 may change the 3D contents into 2D contents (S250).

In this case, the image display device 200 may display the changed 2D contents in a 2D mode (S260).

As described above, according to the image display device providing a glass-free 3D image based on a parallax barrier scheme or the image display method according to embodiments disclosed in the present disclosure, by changing a disposition direction of the parallax barrier and a rendering scheme corresponding to a 3D image on the basis of an event generated on the screen of the image display device, the user of the image display device can continuously visually recognize a 3D effect with respect to the 3D image.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An image display device for providing a 3D image according to a glass-free scheme on the basis of binocular disparity, the device comprising:
a display unit configured to display a 3D image on a screen;
a sensing unit configured to sense whether an event in relation to a change in a disposition direction of a layer generating binocular disparity corresponding to the 3D image and a change in a rendering scheme corresponding to the 3D image; and
a control unit configured to change the disposition direction of the layer and the rendering scheme corresponding to the 3D image on the basis of the event, and
wherein the glass-free scheme on the basis of binocular disparity is a parallax barrier scheme and the layer is a parallax barrier, and
wherein the event is a rotation of the image display device,
the control unit changes a disposition direction of the parallax barrier and a rendering scheme corresponding to the 3D image on the basis of a rotation of the image display device, and
a rotation of the image display device is a rotation of a longer axis of the image display device from any one of a first direction horizontal to the line connecting both eyes of the user of the image display device and a second direction perpendicular to the line connecting the both eyes of the user to a different direction, and
wherein the 3D image includes a first image corresponding to the left eye of the user of the image display device and a second image corresponding to the right eye of the user of the image display device,
wherein the first image and the second image are displayed on the screen such that they are spaced apart from one another in the first direction by an image depth corresponding to the 3D image,
wherein when a rotation of the image display device is sensed,
the control unit changes the rendering scheme on the basis of a previously determined display scheme corresponding to the image display device,
wherein when the display scheme of the image display device is a screen conversion mode,
the control unit changes the rendering scheme such that the first image and the second image are rotated in a direction opposite to the rotation direction of the image display device, so as to be displayed, and
when the display scheme of the image display device is a screen non-conversion mode,
the control unit changes the rendering scheme such that the first image and the second image are kept to be spaced apart from one another in the first direction so as to be displayed on the screen.

2. The image display device of claim 1, wherein the disposition direction of the parallax barrier is a direction perpendicular to a line connecting both eyes of a user of the image display device.

3. The image display device of claim 1, wherein the rendering scheme is a scheme implementing a 3D effect on the basis of a first image corresponding to a left eye of the user of the image display device and a second image corresponding to a right eye of the user of the image display device displayed according to a particular screen display scheme,
wherein the 3D effect is implemented as an image depth corresponding to the 3D image is generated on the basis of a difference between viewing angles of the user with respect to the first image and the second image generated through a space between patterns corresponding to the parallax barrier.

4. The image display device of claim 3, wherein the particular screen display scheme is at least one of a landscape image display scheme in which a width of a landscape image in a horizontal direction is greater than a height thereof in a vertical direction and a portrait image display scheme of the reverse.

5. The image display device of claim 1, wherein the event is a touch and a drag event on the basis of the touch, and
the control unit changes a disposition direction of the parallax barrier and the rendering scheme corresponding to the 3D image on the basis of the touch and the drag event.

6. The image display device of claim 5, wherein the touch and the drag event includes a first touch and a first drag event rotating on the screen on the basis of the first touch, and
the control unit changes the disposition direction of the parallax barrier and the rendering scheme corresponding to the 3D image on the basis of a rotation direction of the first drag event.

7. The image display device of claim 6, wherein the control unit changes a disposition direction of the parallax barrier such that the parallax barrier is continuously disposed to be perpendicular to the line connecting the both eyes of the user of the image display device on the basis of the rotation direction of the first drag event.

8. The image display device of claim 5, wherein the touch and the drag event includes a second touch, a second drag event on the basis of the second touch, and a third touch and a third drag event rotating on the screen on the basis of the third touch,
wherein the control unit divides the screen into a first region and a second region on the basis of the second drag event, and
changes a disposition direction of a parallax barrier corresponding to any one of the first region and the second region and a rendering scheme of an image on the basis of the rotation direction of the third drag event.

9. The image display device of claim 8, wherein the any one region is a region in which the third touch has been applied among the first region and the second region.

10. The image display device of claim 8, wherein an image corresponding to any one region includes a third image corresponding to the left eye of the user of the image display device and a fourth image corresponding to the right eye of the user,
wherein when the third drag event is sensed, the control unit changes a rendering scheme corresponding to the any one region on the basis of a previously determined display scheme corresponding to the image display device such that the third image and the fourth image are rotated to be displayed in a direction opposite to a rotation direction of the third drag event.

11. The image display device of claim 1, wherein when the image display device does not provide a function in relation to a change of the disposition direction of the parallax barrier and a change in the rendering scheme corresponding to the 3D image,
the control unit controls the display unit to change the 3D image into a 2D image and display the same.

12. An image display device for providing a 3D image according to a glass-free scheme on the basis of binocular disparity, the device comprising:
a display unit configured to display a 3D image on a screen;
a sensing unit configured to sense whether an event in relation to a change in a disposition direction of a layer generating binocular disparity corresponding to the 3D image and a change in a rendering scheme corresponding to the 3D image; and
a control unit configured to change the disposition direction of the layer and the rendering scheme corresponding to the 3D image on the basis of the event, and
wherein the glass-free scheme on the basis of binocular disparity is a parallax barrier scheme and the layer is a parallax barrier, and
wherein the event is a touch and a drag event on the basis of the touch, and
the control unit changes a disposition direction of the parallax barrier and the rendering scheme corresponding to the 3D image on the basis of the touch and the drag event, and
wherein the touch and the drag event includes a first touch and a first drag event rotating on the screen on the basis of the first touch, and
the control unit changes the disposition direction of the parallax barrier and the rendering scheme corresponding to the 3D image on the basis of a rotation direction of the first drag event, and
wherein the 3D image includes a first image corresponding to the left eye of the user of the image display device and a second image corresponding to the right eye of the user,
wherein the first image and the second image are displayed on the screen such that they are spaced apart spaced apart in a third direction horizontal to the line connecting both eyes of the user of the image display device by an image depth corresponding to the 3D image,
wherein when the first drag event is sensed,
the control unit changes the rendering scheme on the basis of a previously determined display scheme corresponding to the image display device,
wherein when the display scheme of the image display device is a screen conversion mode,
the control unit changes the rendering scheme such that the first image and the second image are rotated in a direction opposite to a rotation direction of the first drag event, and
when the display scheme of the image display device is a screen non-conversion mode,
the control unit changes the rendering scheme such that the first image and the second image are continuously displayed to be spaced apart in the third direction on the screen.

* * * * *